US012763894B2

(12) United States Patent
Yu et al.

(10) Patent No.: US 12,763,894 B2
(45) Date of Patent: Oct. 13, 2026

(54) COMMUNICATION METHOD AND APPARATUS

(71) Applicant: HUAWEI TECHNOLOGIES CO., LTD., Shenzhen (CN)

(72) Inventors: Jian Yu, Shenzhen (CN); Jinzhe Pan, Shenzhen (CN); Mengshi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 18/363,856

(22) Filed: Aug. 2, 2023

(65) Prior Publication Data

US 2023/0379114 A1 Nov. 23, 2023

Related U.S. Application Data

(63) Continuation of application No. PCT/CN2021/122848, filed on Oct. 9, 2021.

(30) Foreign Application Priority Data

Feb. 2, 2021 (CN) ......................... 202110144551.5

(51) Int. Cl.

*H04B 3/10* (2006.01)
*H04L 1/00* (2006.01)
*H04L 5/00* (2006.01)

(52) U.S. Cl.

CPC .......... *H04L 5/0048* (2013.01); *H04L 1/0013* (2013.01)

(58) Field of Classification Search

None

See application file for complete search history.

(56) References Cited

U.S. PATENT DOCUMENTS

2019/0260531 A1 8/2019 Chen et al.
2019/0380117 A1* 12/2019 Verma .................. H04L 5/0007

(Continued)

FOREIGN PATENT DOCUMENTS

CN 112262541 A 1/2021

OTHER PUBLICATIONS

Mediatek (IEEE 802.11-19/1907r0, âMultiple RU Combinations for EHTâ, Nov. 2019). (Year: 2019).*

(Continued)

*Primary Examiner* — Maharishi V Khirodhar
(74) *Attorney, Agent, or Firm* — HAUPTMAN HAM, LLP

(57) ABSTRACT

Embodiments of this application relate to the field of wireless communication technologies, and disclose a communication method and apparatus. The method includes: generating a PPDU, where the PPDU has one or more discrete resource units, the discrete resource unit includes a plurality of sub-resource units, the plurality of sub-resource units include a plurality of discontiguous sub-resource units in an unpunctured sub-channel in a first channel, and/or the plurality of sub-resource units include a plurality of sub-resource units in a plurality of unpunctured sub-channels in the first channel; the sub-channel includes a plurality of resource units RUs, and the sub-resource unit includes some or all subcarriers in one RU; and the first channel includes a plurality of sub-channels; and sending the PPDU. The solutions in this application are used in a wireless local area network system supporting a next-generation Wi-Fi EHT protocol of the IEEE 802.11.

20 Claims, 16 Drawing Sheets

(56) References Cited

U.S. PATENT DOCUMENTS

| | | | | |
|---|---|---|---|---|
| 2020/0014509 | A1 | 1/2020 | Asterjadhi et al. | |
| 2023/0014333 | A1* | 1/2023 | Park | H04L 27/2602 |
| 2023/0309087 | A1* | 9/2023 | Huang | H04L 5/0044 |

OTHER PUBLICATIONS

IEEE Std 802.11a-1999 (Supplement to IEEE Std 802.11-1999), Supplement to IEEE Standard forInformation technology—Telecommunications and information exchangebetween systems—Local and metropolitan area networks—Specific requirements—Part 11: Wireless LAN Medium Access Control(MAC) and Physical Layer (PHY) specifications: High-speed Physical Layer in the 5 GHZ Band, Approved Sep. 16, 1999, total 90 pages.

IEEE Std 802.11b-1999 Supplement toANSI/IEEE Std 802.11, 1999 Edition Supplement to IEEE Standard for Information technology—Telecommunications and information exchange between systems—Local and metropolitan area networks—Specific requirements—Part 11: Wireless LAN Medium Access Control(MAC) and Physical Layer (PHY) specifications: Higher-Speed Physical Layer Extension in the 2.4GHz Band Approved Sep. 16, 1999, total 97 pages.

IEEE Std 802.11g™—2003, IEEE Standard for Information technology—Telecommunications and information exchange between systems—Local and metropolitan area networks—Specific requirements—Part 11:Wireless LAN Medium Access Control(MAC) and Physical Layer(PHY) specifications—Amendment 4:Further Higher Data Rate Extension in the 2.4 GHz Band, dated Jun. 12, 2003, total 77 pages.

IEEE Std 802.11n™—2009, Part 11: Wireless LAN Medium Access Control (MAC) and Physical Layer (PHY) specifications, Amendment 5: Enhancements for Higher Throughput, Oct. 29, 2009, total 536 pages.

IEEE Std 802.11ac™—2013, Part 11: Wireless LAN Medium Access Control (MAC) and Physical Layer (PHY) Specifications, Amendment 4: Enhancements for Very High Throughput for Operation in Bands below 6 GHZ, Dec. 11, 2013, total 425 pages.

IEEE P802. 11ax™M/D8.0, Part 11: Wireless LAN Medium Access Control(MAC) and Physical Layer (PHY) Specifications,Amendment 1: Enhancements for High Efficiency WLAN, Oct. 2020, total 820 pages.

IEEE P802.11be™M/D0.2, Part 11: Wireless LAN Medium Access Control (MAC) and Physical Layer (PHY) Specifications,Amendment 8: Enhancements for extremely high throughput (EHT), Oct. 2020, total 409 pages.

International Search Report issued in corresponding International Application No. PCT/CN2021/122848, dated Jan. 6, 2022, pp. 1-9.

Chinese First Office Action issued in corresponding Chinese Application No. 202110144551.5, dated May 1, 2026, pp. 1-13.

* cited by examiner

COMMUNICATION METHOD AND APPARATUS

CROSS-REFERENCE TO RELATED APPLICATIONS

This application is a continuation of International Application No. PCT/CN2021/122848, filed on Oct. 9, 2021, which claims priority to Chinese Patent Application No. 202110144551.5, filed on Feb. 2, 2021. The disclosures of the aforementioned applications are hereby incorporated by reference in their entireties.

TECHNICAL FIELD

Embodiments of this application relate to the field of wireless communication technologies, and in particular, to a communication method and apparatus.

BACKGROUND

In a wireless local area network (wireless local area network, WLAN), a concept of sub-channel bonding is introduced to improve a transmission capability. For example, two or more sub-channels (for example, one primary sub-channel and several secondary sub-channels) are bound together, so that a terminal transmits data on a wide frequency resource.

However, in a period of time or at a specific moment, a sub-channel cannot be used to transmit a physical layer protocol data unit (physical protocol data unit, PPDU) due to some possible reasons. In this case, the sub-channel is in a busy state and is unavailable. For example, when a WLAN user needs to actively avoid a user authorized on a sub-channel 2, a PPDU of the WLAN user cannot be transmitted on the sub-channel 2, and the sub-channel 2 is in a busy state. In a sub-channel bonding mechanism, if a secondary sub-channel is in a busy state, a bandwidth dimension of an entire bound channel is directly reduced.

For channel bandwidth dimension reduction caused by these sub-channels that are not allowed to transmit a PPDU, the 802.11ax proposes a preamble puncture (preamble puncture) transmission method. In the transmission method, other available sub-channels except a sub-channel in a busy state are bound, so that even if the secondary sub-channel is in the busy state, the channel bandwidth dimension is not reduced. An 80 megahertz (megahertz, MHz) channel is used as an example. The 80 MHz includes one 20 MHz primary sub-channel and three 20 MHz secondary sub-channels. When one 20 MHz secondary sub-channel is in a busy state and is unavailable, data can still be sent on spectrum resources on the 20 MHz primary sub-channel and the 40 MHz secondary sub-channel. Compared with a non-preamble puncture mode in which only a 20 MHz primary sub-channel can be used, in a preamble puncture mode, spectrum utilization can reach 300%.

However, in a preamble puncture mechanism, several available sub-channels are bound. In the conventional technology, sub-resource units (sub-resource units, sub-RUs) may be discretely distributed on a plurality of sub-channels, to improve a transmission bandwidth, and sub-RUs on different sub-channels may be combined. When a sub-channel with combined sub-RUs includes a punctured sub-channel, the combined sub-RUs cannot be used, and transmission efficiency is reduced.

SUMMARY

Embodiments of this application provide a communication method and apparatus, to effectively improve transmit power of a transmit end in a preamble puncture scenario.

To achieve the foregoing objectives, the following technical solutions are used in embodiments of this application.

According to a first aspect, a communication method is provided. The method includes: generating a PPDU, where the PPDU has one or more discrete resource units, the discrete resource unit includes a plurality of sub-resource units, the plurality of sub-resource units include a plurality of discontiguous sub-resource units in an unpunctured sub-channel in a first channel, and/or the plurality of sub-resource units include sub-resource units in a plurality of unpunctured sub-channels in the first channel; the sub-channel includes a plurality of resource units RUs, and the sub-resource unit includes some or all subcarriers in one RU; and the first channel includes a plurality of sub-channels; and sending the PPDU.

Based on the method according to the first aspect, a plurality of discrete sub-RUs in frequency domain can be allocated to a user, to more fully use frequency domain resources, and a subcarrier of a single RU covers a wider frequency range. This can improve transmit power of a transmit end, power of a unit subcarrier, and an equivalent signal-to-noise ratio of the receive end.

In a possible design, the first channel includes a first sub-channel combination and a second sub-channel combination; and if the first sub-channel combination has one punctured sub-channel, and the second sub-channel combination has no punctured sub-channel, the plurality of discrete resource units include a first discrete resource unit and a second discrete resource unit, the first discrete resource unit includes sub-resource units corresponding to different RUs in unpunctured sub-channels in the first sub-channel combination, and the second discrete resource unit is a discrete resource unit corresponding to the second sub-channel combination.

Based on this possible design, combination manners of the resource units can be flexibly adjusted when a single sub-channel is punctured. This fully uses the frequency domain resources, and improves the transmit power of the transmit end.

In a possible design, the first channel includes a first sub-channel combination and a second sub-channel combination; and if the first sub-channel combination and the second sub-channel combination each have one punctured sub-channel, the discrete resource unit includes a sub-resource unit corresponding to a RU in another unpunctured sub-channel in the first sub-channel combination and a sub-resource unit corresponding to a RU in another unpunctured sub-channel in the second sub-channel combination.

Based on this possible design, combination manners of the resource units can be flexibly adjusted when two sub-channels are punctured. This fully uses the frequency domain resources, and improves the transmit power of the transmit end.

In a possible design, the first channel includes a first sub-channel combination, the first sub-channel combination includes all sub-channels in the first channel, and if the first sub-channel combination has at least one punctured sub-channel, the plurality of discrete resource units includes a first discrete resource unit and/or a second discrete resource unit, the first discrete resource unit includes sub-resource units corresponding to different RUs in one sub-channel of unpunctured sub-channels, and the second discrete resource unit includes sub-resource units corresponding to RUs in a plurality of sub-channels of unpunctured sub-channels.

Based on this possible design, combination manners of the resource units can be flexibly adjusted when at least one sub-channel is punctured. This fully uses the frequency domain resources, and improves the transmit power of the transmit end.

In a possible design, the first channel is obtained by dividing a frequency domain resource, a bandwidth of the frequency domain resource is greater than a first preset bandwidth, a bandwidth of the first channel is a second preset bandwidth, and the frequency domain resource is a pre-configured resource for transmitting data.

Based on this possible design, the frequency domain resources can be flexibly allocated, to improve data transmission efficiency.

In a possible design, the sub-resource unit includes a pilot subcarrier, and the pilot subcarrier is for transmitting a pilot signal.

Based on this possible design, a fixed value may be transmitted through the pilot signal, so that the receive end performs phase correction based on the fixed value, thereby improving data transmission accuracy.

In a possible design, the PDDU carries resource scheduling information, and the resource scheduling information is carried in a preamble field of the PPDU.

Based on this possible design, the transmission resources can be flexibly and quickly allocated for transmitting data of different users, to effectively improve data transmission efficiency.

In a possible design, the method further includes: receiving a trigger frame from a receive end when the discrete resource unit is for transmitting uplink data, where the trigger frame carries resource scheduling information.

Based on this possible design, the transmission resources can be flexibly and quickly allocated for transmitting data of different users, to effectively improve data transmission efficiency.

In a possible design, the resource scheduling information indicates the one or more discrete resource units, the sub-resource unit includes a plurality of subcarriers, and the resource scheduling information includes an index of a RU corresponding to the discrete resource unit and an index of a subcarrier included in the sub-resource unit.

Based on this possible design, the plurality of discrete sub-RUs in frequency domain can be allocated to the user based on related index information, to more fully use the frequency domain resources, and a subcarrier of a single RU covers a wider frequency range. This effectively improves the transmit power.

According to a second aspect, a communication method is provided. The method includes: receiving a physical layer protocol data unit PPDU, where the PPDU has one or more discrete resource units, the discrete resource unit includes a plurality of sub-resource units, the plurality of sub-resource units include a plurality of discontiguous sub-resource units in an unpunctured sub-channel in a first channel, and/or the plurality of sub-resource units include sub-resource units in a plurality of unpunctured sub-channels in the first channel; the sub-channel includes a plurality of resource units RUs, and the sub-resource unit includes some or all subcarriers in one RU; and the first channel includes a plurality of sub-channels; and performing data processing on the PPDU, to determine a resource unit allocation status.

For any possible design of the second aspect, refer to any possible design of the first aspect. Details are not described again.

For technical effects brought by any one of the second aspect or the possible designs of the second aspect, refer to technical effects brought by any one of the first aspect or the possible designs of the first aspect. Details are not described again.

According to a third aspect, a communication apparatus is provided. The communication apparatus may be a base station or a chip or a system-on-a-chip in the base station. The base station includes one or more processors and one or more memories. The one or more memories are coupled to the one or more processors, and the one or more memories are configured to store computer program code. The computer program code includes computer instructions, and when the one or more processors execute the computer instructions, the base station is enabled to perform the communication method according to any one of the first aspect or the possible designs of the first aspect.

According to a fourth aspect, a communication apparatus is provided. The communication apparatus may be a terminal or a chip or a system-on-a-chip in a terminal. The terminal includes one or more processors and one or more memories. The one or more memories are coupled to the one or more processors, and the one or more memories are configured to store computer program code. The computer program code includes computer instructions. When the one or more processors execute the computer instructions, the terminal is enabled to perform the communication method according to any one of the second aspect or the possible designs of the second aspect.

According to a fifth aspect, a computer-readable storage medium is provided. The computer-readable storage medium may be a readable non-volatile storage medium. The computer-readable storage medium stores instructions. When the instructions are run on a computer, the computer is enabled to perform the communication method according to any one of the first aspect or the possible designs of the first aspect or any one of the second aspect or the possible designs of the second aspect.

According to a sixth aspect, a computer program product including instructions is provided. When the computer program product runs on a computer, the computer is enabled to perform the communication method according to any one of the first aspect or the possible designs of the first aspect or any one of the second aspect or the possible designs of the second aspect.

According to a seventh aspect, a communication system is provided. The communication system may include an access point and a station. The communication system includes the communication apparatus according to the third aspect and the fourth aspect, and may perform the communication method according to any one of the first aspect or the possible designs of the first aspect or any one of the second aspect or the possible designs of the second aspect.

For technical effects brought by any design manner of the third aspect to the fifth aspect, refer to technical effects brought by any one of the first aspect or the possible designs of the first aspect or any one of the second aspect or the possible designs of the second aspect. Details are not described again.

DESCRIPTION OF EMBODIMENTS

Figure 1:
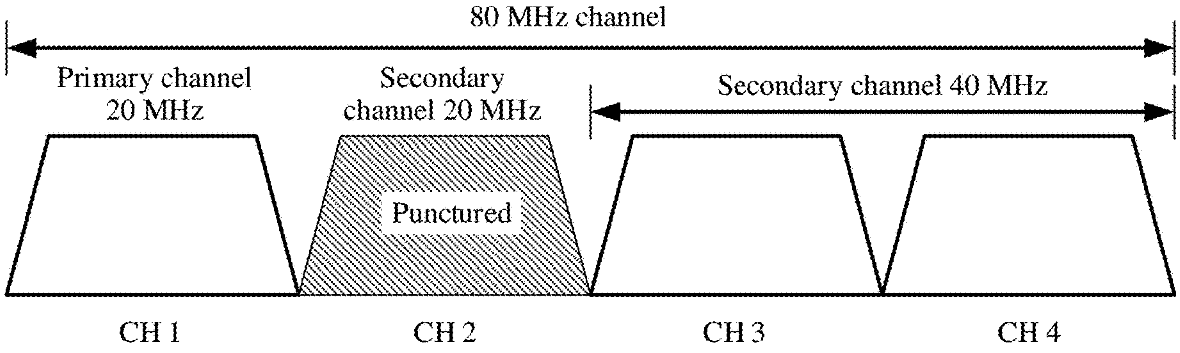
FIG. 1 is a schematic diagram of a transmission channel in a preamble puncture scenario.

To make the objectives, technical solutions, and advantages of this application clearer, the following further describes this application in detail with reference to the accompanying drawings.

Terms such as "first" and "second" mentioned below are merely intended for a purpose of description, and shall not be understood as an indication or implication of relative importance or implicit indication of a quantity of indicated technical features. Therefore, a feature defined by "first" or "second" may explicitly or implicitly include one or more features. In the descriptions of this application, unless otherwise stated, "a plurality of" means two or more than two.

In addition, in embodiments of this application, the word "example" or "for example" is used to represent giving an example, an illustration, or a description. Any embodiment or design scheme described as an "example" or "for example" in embodiments of this application should not be explained as having more advantages than another embodiment or design scheme. To be precise, the word such as "example" or "for example" is intended to present a related concept in a specific manner.

Before embodiments of this application are described, some terms in embodiments of this application are explained.

A wireless local area network (wireless local area network, WLAN) is a network system in which computer devices are interconnected by using a wireless communication technology, and can communicate with each other and share resources. During evolution of the internet technologies, standards related to a WLAN technology are also continuously updated. For example, the 802.11n standard is referred to as a high throughput (high throughput, HT), the 802.11ac standard is referred to as a very high throughput (very high throughput, VHT), the 802.11ax standard is referred to as high efficient (high efficient, HE), and the 802.11be standard is referred to as an extremely high throughput (extremely high throughput, EHT). Different WLAN standards support different bandwidth configurations. For example, the 802.11ax supports the following bandwidth configurations: 20 MHz, 40 MHz, 80 MHz, 160 MHz, and a combined bandwidth (80 MHz+80 MHz); and the 802.11be supports the following bandwidth configurations: 240 MHz, a combined bandwidth (160 MHz+80 MHz), 320 MHz, and a combined bandwidth (160 MHz+160 MHz). Transmit power varies in different bandwidth configurations. For example, the following uses a low power indoor (low power indoor, LPI) scenario as an example to describe a relationship between maximum transmit power and a transmit bandwidth.

The low power indoor (low power indoor, LPI) is a communication manner defined in a regulation on a spectrum of 6 gigahertz (gigahertz, GHz) promulgated by the Federal Communications Commission. In this communication manner, maximum power and maximum power spectral density sent by different network devices in a WLAN are specified. Maximum power sent by an access point (access point, AP) is 36 decibel-milliwatts (decibel-milliwatts, dBm), and maximum power spectral density of the access point is 5 decibel-milliwatts/megahertz (decibel-milliwatts/megahertz, dBm/MHz); and maximum transmit power sent by a station (station, STA) is 24 dBm, and maximum power spectral density of the station is −1 dBm/MHz. For the network device, transmit power cannot exceed the maximum power, and transmit power spectral density cannot exceed the maximum power spectral density. Compared with the maximum power, the maximum power spectral density restricts maximum transmit power of the device more strictly.

Table 1 shows a relationship between maximum transmit power and a transmit bandwidth in a LPI scenario. As shown in Table 1, as the transmit bandwidth increases, the maximum transmit power of devices also increases accordingly. When the transmit bandwidth is 320 MHz, the maximum transmit power of the devices reaches the maximum power specified in the regulation. When the transmit bandwidth is lower than 320 MHz, the maximum transmit power of the devices is lower because of restrictions of the maximum power spectral density.

TABLE 1

Relationship between the maximum transmit power and the transmit bandwidth in the LPI scenario

| Transmit bandwidth | Maximum transmit power of the AP | Maximum transmit power of the STA |
|---|---|---|
| 20 MHz | 18 | 12 |
| 40 MHz | 21 | 15 |
| 80 MHZ | 24 | 18 |
| 160 MHz | 27 | 21 |
| 320 MHz | 30 | 24 |

It can be learned from Table 1 that a larger transmit bandwidth indicates higher transmit power of the AP or the STA. Therefore, to obtain larger transmit power, the AP or the STA needs to work at a larger transmit bandwidth. Currently, the transmit bandwidth of the AP or the STA may be increased through channel bonding. Channel bonding means that two or more sub-channels (sub-channels) (for example, one primary sub-channel and several secondary sub-channels) are bound together, so that a terminal transmits data on a wide frequency resource. However, if a secondary sub-channel is in a busy state, a bandwidth dimension of an entire bound channel is directly reduced. To improve spectral utilization when some channels are unavailable, a preamble puncture (preamble puncture) mechanism is proposed. The following describes the preamble puncture mechanism.

The preamble puncture (preamble puncture) mechanism is a transmission method proposed in 802.11ax for improving transmit power. In the transmission method, another available sub-channel other than the sub-channel in the busy state is bound, so that even if the secondary sub-channel is in the busy state, the channel bandwidth dimension is not reduced. The sub-channel in the busy state is unavailable for a WLAN user. In embodiments of this application, a sub-channel in a busy state may alternatively be described as a punctured sub-channel. Reasons why the sub-channel is in the busy state and is unavailable include one or more of the following three reasons: (1) There is a radar signal on the sub-channel. For example, in an unlicensed spectrum, a transmit signal of a WLAN user needs to actively avoid a radar signal on a current sub-channel. In this case, the sub-channel is unavailable for the WLAN user. (2) There is an authorized user on the sub-channel. For example, there is an authorized user, also referred to as an incumbent user (incumbent user), on a specific sub-channel, and a transmit signal of a WLAN user needs to actively avoid a transmit signal of the authorized user on the sub-channel. In this case, the sub-channel is unavailable for the WLAN user. (3) There is interference from another user on the sub-channel. For example, in a specific time period, a plurality of interference signals on a sub-channel severely affect signal transmission of a WLAN user. In this case, the sub-channel is unavailable for the WLAN user.

FIG. 1 is a schematic diagram of a transmission channel in a preamble puncture scenario. As shown in FIG. 1, four sub-channels are respectively marked as a CH 1, a CH 2, a CH 3, and a CH 4 in ascending order of frequencies on an 80 MHz spectrum, and a bandwidth of each sub-channel is 20 MHz. The CH 1 is a primary sub-channel, and the CH 2 to CH 4 are secondary sub-channels. When the CH 2 is punctured, the available sub-channels CH 1, CH 3, and CH 4 may be bonded by using a preamble puncture transmission mechanism before data is transmitted. Compared with a non-preamble puncture mode in which only the primary sub-channel CH 1 can be used for transmitting data, spectrum utilization can reach 300%.

The channel or the sub-channel in this application may include a plurality of resource units (resource units, RUs), and the RU is a frequency domain resource form obtained after channel bandwidths/sub-channel bandwidths are divided by using an orthogonal frequency division multiple access (orthogonal frequency-division multiple access, OFDMA) technology. The RU may be a 26-tone RU, a 52-tone RU, a 106-tone RU, a 242-tone RU, a 484-tone RU, a 996-tone RU, or the like, where tone represents a subcarrier. For example, the 26-tone RU represents a RU including 26 contiguous subcarriers, or a RU including a group of 13 contiguous subcarriers and another group of 13 contiguous subcarriers. The 26-tone RU may be allocated to one user. The user in this application may be understood as a STA. Subcarriers in each RU include a data (data) subcarrier and a pilot (pilot) subcarrier. The data subcarrier is for carrying data information from an upper layer. The pilot subcarrier is for transferring a fixed value, where the fixed value may be used by a receive end to estimate a phase and perform phase correction.

In a possible design, a complete RU is split into a plurality of sub-resource units (sub-resource units, sub-RUs), and the sub-RUs are combined with sub-RUs corresponding to a RU in another sub-channel, so that a sum of frequency ranges of several discontiguous sub-RUs is greater than an original frequency range of consecutive RUs. In this way, when power spectral density reaches a maximum value, compared with contiguous RUs, discrete RUs can improve transmit power of a single RU when data is transmitted. However, in a preamble puncture transmission mechanism, if a sub-channel including a RU combination is punctured, the RU in the combination cannot be used for transmitting a physical protocol data unit (PHY protocol data unit, PPDU), and spectrum utilization is reduced. As a result, transmission efficiency of the transmit end is greatly reduced.

To improve transmit power of the transmit end in the preamble puncture scenario, embodiments of this application provide a communication method. The method includes: generating a PPDU, where the PPDU has one or more discrete resource units, the discrete resource unit includes a plurality of sub-resource units, the plurality of sub-resource units include a plurality of discontiguous sub-resource units in an unpunctured sub-channel in a first channel, and/or the plurality of sub-resource units include sub-resource units in a plurality of unpunctured sub-channels in the first channel; the sub-channel includes a plurality of resource units RUs, and the sub-resource unit includes some or all subcarriers in one RU; and the first channel includes a plurality of sub-channels; and sending the PPDU.

The following describes the communication method provided in embodiments of this application with reference to the accompanying drawings.

The communication method provided in embodiments of this application is applied to various communication systems, for example, a long term evolution (long term evolution, LTE) system, a 5th generation (5th generation, 5G) mobile communication system, a wireless fidelity (wireless fidelity, Wi-Fi) system, a future communication system, or a system integrating a plurality of communication systems. This is not limited in embodiments of this application. 5G may also be referred to as new radio (new radio, NR).

The communication method provided in embodiments of this application is applied various communication scenarios, for example, applied to one or more of the following communication scenarios: enhanced mobile broadband (enhanced mobile broadband, eMBB), ultra reliable low latency communication (ultra reliable low latency communication, URLLC), machine type communication (machine type communication, MTC), massive machine type communications (massive machine type communications, mMTC), device to device (device to device, D2D), vehicle to everything (vehicle to everything, V2X), vehicle to vehicle (vehicle to vehicle, V2V), and an internet of things (internet of things, IoT).

Specifically, the communication method provided in embodiments of this application is used in a wireless communication system. The wireless communication system may be a WLAN or a cellular network. The method may be implemented by a communication device in the wireless communication system, or by a chip or a processor in the communication device. In the wireless local area network, the communication device supports communication based on an IEEE 802.11 series protocol, and the IEEE 802.11 series protocol includes 802.11be, 802.11ax, or 802.11a/b/g/n/ac.

Figure 2:
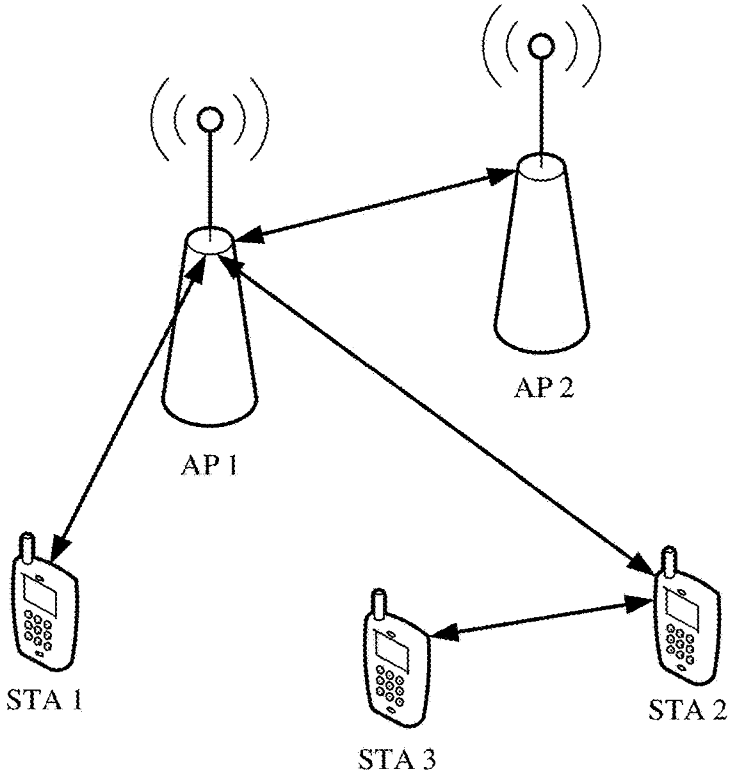
FIG. 2 is a schematic diagram of a communication architecture according to an embodiment of this application.

FIG. 2 is a schematic diagram of a communication architecture according to an embodiment of this application. The following describes the communication method provided in embodiments of this application by using the communication architecture shown in FIG. 2 as an example. The communication architecture may be a wireless local area network, and the communication architecture may include one or more access point (access point, AP) stations and one or more non-access point stations (none access point stations, non-AP STAs). For ease of description, in this specification, an access point station is referred to as an access point (AP), and a non-access point station is referred to as a station (STA). The APs are, for example, an AP 1 and an AP 2 in FIG. 2, and the STAs are, for example, a STA 1, a STA 2, and a STA 3 in FIG. 2. The following describes network elements or devices in the communication architecture shown in FIG. 2.

The AP may be an AP used by a terminal device (for example, a mobile phone) to access a wired (or wireless) network, and is mainly deployed at home, in a building, and in a park. A typical coverage radius is tens of meters to a hundred meters. Certainly, the access point may also be deployed outdoors. The AP is equivalent to a bridge that connects a wired network and a wireless network; and is mainly used to connect wireless network clients to each other, and then connect the wireless network to the Ethernet. Specifically, the AP may be a terminal device (such as a mobile phone) or a network device (such as a router) with a Wi-Fi chip. The AP may be a device that supports the 802.11be standard. The AP may also be a device that supports a plurality of WLAN standards of the 802.11 family, such as 802.11be, 802.11ax, 802.11ac, 802.11n, 802.11g, 802.11b, and 802.11a.

The AP in this application may be an extremely high throughput (extremely high throughput, EHT) AP, or may be an AP applicable to a future-generation Wi-Fi standard.

Specifically, the AP is configured to implement at least one function of resource scheduling, radio resource management, and radio access control of the STA. The AP may include a base station, a wireless access point, a transmission reception point (transmission receive point, TRP), a transmission point (transmission point, TP), a continuously evolved NodeB (gNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (BTS), a home base station (for example, home evolved NodeB, or home NodeB, HNB), a base band unit (base band unit, BBU), a Wi-Fi access point, or any one of some other access nodes. In embodiments of this application, an apparatus for implementing a function of the AP may be an AP, or may be an apparatus that can support the AP in implementing the function, for example, a chip system. The apparatus may be installed in the AP for matching use. In the technical solutions provided in embodiments of this application, an example in which an apparatus for implementing a function of the AP is an AP is used to describe the communication method provided in embodiments of this application.

The AP may include a processor and a transceiver. The processor is configured to control and manage an action of the AP, and the transceiver is configured to receive or send information.

The STA may be a wireless communication chip, a wireless sensor, a wireless communication terminal, or the like, and may also be referred to as a user. For example, the STA may be a mobile phone that supports a Wi-Fi communication function, a tablet computer that supports a Wi-Fi communication function, a set top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the STA may support the 802.11be standard. The STA may also support a plurality of WLAN standards of the 802.11 family, such as 802.11be, 802.11ax, 802.11ac, 802.11n, 802.11g, 802.11b, and 802.11a.

The STA in this application may be an extremely high throughput STA, or may be a STA applicable to a future-generation Wi-Fi standard.

Specifically, the STA may be a terminal device (terminal equipment), a user device (user equipment, UE), a mobile station (mobile station, MS), a mobile terminal (mobile terminal, MT), or the like. The terminal may be a mobile phone (mobile phone), a tablet computer, or a computer with a wireless transceiver function, or may be a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a smart home, a vehicle-mounted terminal, or the like. In embodiments of this application, an apparatus for implementing a function of the STA may be a STA, or may be an apparatus that can support the STA in implementing the function, for example, a chip system. The apparatus may be installed in the STA or used in matching with the STA. In the technical solutions provided in embodiments of this application, an example in which an apparatus for implementing a function of the STA is a STA is used to describe the communication method provided in embodiments of this application.

The STA may include a processor and a transceiver. The processor is configured to control and manage an action of the access point, and the transceiver is configured to receive or send information.

In the communication architecture provided in embodiments of this application, a plurality of APs and STAs may use hybrid networking, to obtain large-range and high-throughput performance. For example, the plurality of APs and STAs are connected in primary/secondary hybrid networking or any other networking mode. As shown in FIG. 2, the AP 1 may be a secondary access device, the AP 2 may be a primary access device, the STA 1, the STA 2, and the STA 3 may be different user terminal devices, and the STA 1 to the STA 3 may access the AP 1 or the AP 2 through a WLAN to perform service transmission with the network. OFDMA may be applied between the AP and the STA.

The primary access device and the secondary access device are relative concepts, and are obtained through division based on functions and/or deployment locations of the access devices. The primary access device may manage access of all or most devices in the entire local area network, and integrate basic functions such as connection and forwarding and service processing functions. The primary access device may be deployed at a core location of the network, for example, at a location of a core network. The secondary access device can work with the primary access device to implement service functions and forward a packet to a lower-level device. Generally, the secondary access device integrates basic functions such as connection and forwarding, and can be deployed at an edge of the network.

It should be noted that names of the network elements and names of interfaces between the network elements in the architecture in FIG. 2 are merely an example. During specific implementation, the network elements and the interfaces between the network elements may have other names. This is not specifically limited in embodiments of this application. In addition, FIG. 2 is merely an example of a framework diagram, and a quantity of nodes included in FIG. 2 and an access manner of the STA are not limited. In addition to the function node shown in FIG. 2, another node may be included, for example, a core network device may be included. This is not limited.

Figure 3:
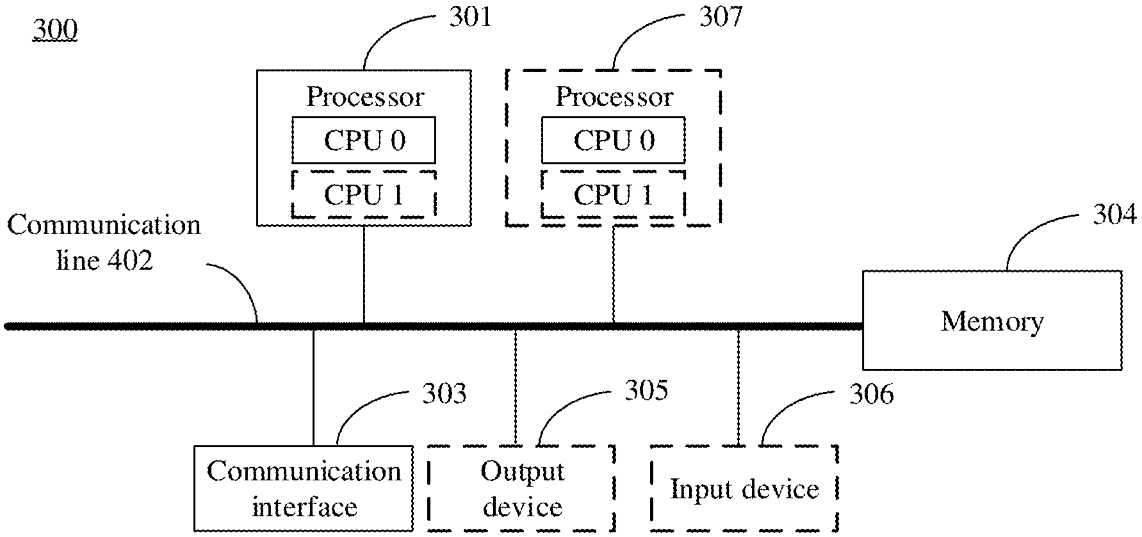
FIG. 3 is a schematic diagram of a structure of a communication apparatus according to an embodiment of this application.

During specific implementation, the network elements shown in FIG. 2, such as the STA and the AP, may use a composition structure shown in FIG. 3 or include components shown in FIG. 3. FIG. 3 is a schematic diagram of a structure of a communication apparatus 300 according to an embodiment of this application. When the communication apparatus 300 has a function of the STA in embodiments of this application, the communication apparatus 300 may be a STA or a chip or a system-on-a-chip in the STA. When the communication apparatus 300 has a function of the AP in embodiments of this application, the communication apparatus 300 may be an AP or a chip or a system-on-a-chip in the AP.

As shown in FIG. 3, the communication apparatus 300 may include a processor 301, a communication line 302, and a communication interface 303. Further, the communication apparatus 300 may include a memory 304. The processor 301, the memory 304, and the communication interface 304 may be connected to each other through the communication line 302.

The processor 301 may be a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. The processor 301 may alternatively be another apparatus having a processing function, for example, a circuit, a component, or a software module. The processor may control a MAC layer and a PHY layer by running a computer program, software code, or instructions in the processor, or by invoking the computer program, the software code, or the instructions stored in the memory 304, to implement the communication method provided in the following embodiments of this application.

The communication line 302 is configured to transmit information between the components included in the communication apparatus 300.

The communication interface 303 is configured to communicate with another device or another communication network. The another communication network may be the Ethernet, a radio access network (radio access network, RAN), a wireless local area network (wireless local area network, WLAN), or the like. The communication interface 303 may be a radio frequency module, a transceiver, or any apparatus that can implement communication.

The memory 304 is configured to store instructions. The instructions may be a computer program.

The memory 304 may be a read-only memory (read-only memory, ROM) or another type of static storage device that can store static information and/or instructions, or may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or other optical disk storage, optical disc storage, or a magnetic disk storage medium or another magnetic storage device. The optical disc storage includes a compact disc, a laser disc, an optical disc, a digital versatile disc, a Blu-ray disc, and the like.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited. The processor 301 is configured to execute the instructions stored in the memory 304, to implement the communication method provided in the following embodiments of this application.

In an example, the processor 301 may include one or more CPUs, for example, a CPU 0 and a CPU 1 in FIG. 3. In an example implementation, the communication apparatus 300 includes a plurality of processors. For example, in addition to the processor 301 in FIG. 3, the communication apparatus 300 may further include a processor 307.

In an example implementation, the communication apparatus 300 further includes an output device 305 and an input device 306. The input device 306 is a keyboard, a mouse, a microphone, a joystick, or the like, and the output device 305 is a device such as a display or a speaker (speaker).

It should be noted that the communication apparatus 300 may be a desktop computer, a portable computer, a network server, a mobile phone, a tablet computer, a wireless terminal, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus may include more or fewer components than those shown in the figure, or some components may be combined, or different component arrangements may be used.

The following describes the communication method provided in embodiments of this application with reference to the communication architecture shown in FIG. 2. Each device in the following embodiments may have the components shown in FIG. 3. Actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

Figure 4:
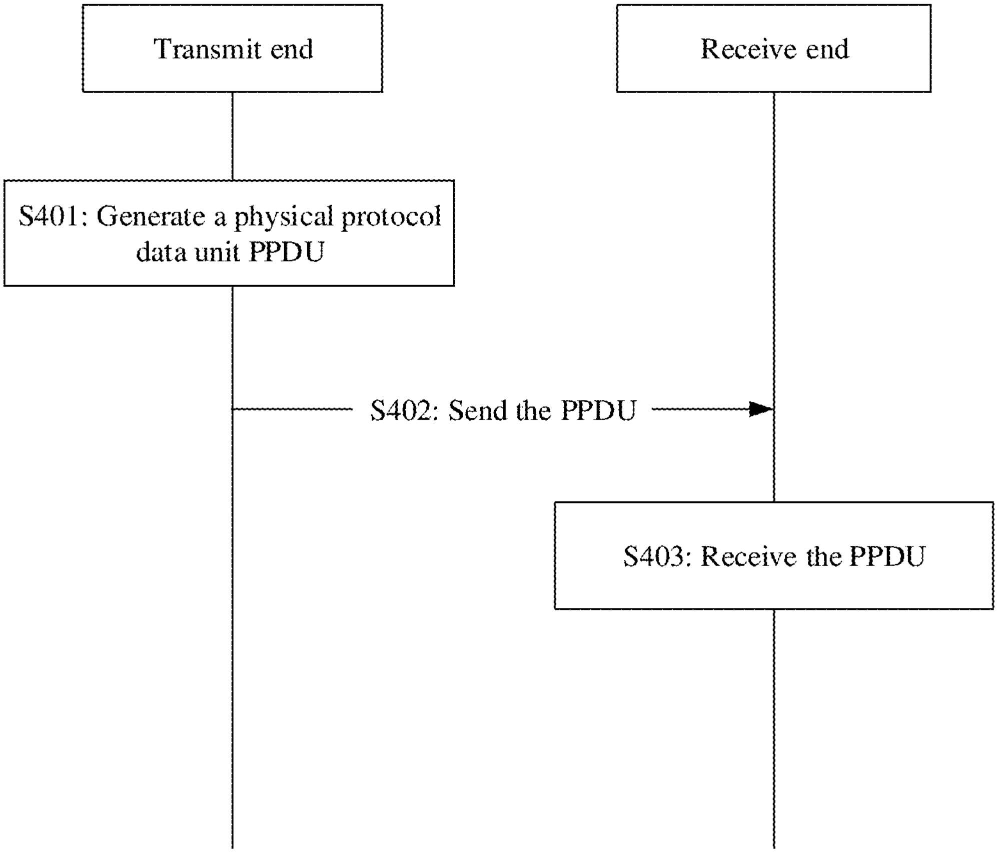
FIG. 4 is a flowchart of a communication method according to an embodiment of this application.

FIG. 4 is a flowchart of a communication method according to an embodiment of this application. The method may be performed by the network element in the communication architecture shown in FIG. 2. As shown in FIG. 4, the method may include the following steps.

S401: A transmit end generates a PPDU.

Specifically, the transmit end may be the AP in FIG. 2, the STA in FIG. 2, or the like. This is not limited.

There may be a plurality of discrete resource units in the PPDU. The discrete resource unit may include a plurality of sub-resource units, the plurality of sub-resource units may include a plurality of discontiguous sub-resource units in an unpunctured sub-channel in a first channel, and/or the plurality of sub-resource units may include a plurality of sub-resource units in a plurality of unpunctured sub-channels in the first channel.

It should be noted that the discrete RU (discrete RU, DRU) in this application may alternatively have another name, and a name of the discrete RU is not limited in this application.

The first channel may be obtained by dividing a frequency domain resource, a bandwidth of the frequency domain resource is greater than a first preset bandwidth, a bandwidth of the first channel is a second preset bandwidth, and the frequency domain resource is a pre-configured resource for transmitting data, for example, a resource for the transmit end to transmit data to a receive end. The frequency domain resource may be a frequency domain resource whose bandwidth is complete, or punctured. The first preset bandwidth may include bandwidths supported in WLAN standards. For example, the first preset bandwidth may include bandwidth configurations supported by 802.11be: 240 MHz, a combined bandwidth (160 MHz+80 MHz), 320 MHz, and a combined bandwidth (160 MHz+160 MHz). The second preset bandwidth may be obtained by dividing the first preset bandwidth, and the second preset bandwidth may be 80 MHz.

For example, the second preset bandwidth is 80 MHz. It is assumed that an available frequency domain resource is 320 MHz. The transmit end divides the 320 MHz bandwidth into four channels of 80 MHz, for example, a first channel, a second channel, a third channel, and a fourth channel. RU distribution on the first channel, the second channel, the third channel, and the fourth channel may be implemented with reference to any RU distribution method in embodiments of this application.

Further, the first channel may include a plurality of sub-channels, and bandwidths of the plurality of sub-channels may be obtained by dividing the second preset bandwidth. Each sub-channel may include one or more RUs, and each RU may be any one of the foregoing 26-tone RU, 52-tone RU, 106-tone RU, 242-tone RU, 484-tone RU, or 996-tone RU. Each RU may be divided into one or more groups of sub-RUs, and each group of sub-RUs may include some or all subcarriers in one RU. Each sub-RU may include a pilot subcarrier, and the pilot subcarrier may be for transmitting a pilot signal. A plurality of subcarriers in each sub-RU may be discrete in frequency domain. For example, two subcarriers in a sub-RU may be separated by one subcarrier or three subcarriers. Sub-RUs in two or more sub-channels in the first channel may be combined together. For example, sub-RUs in two sub-channels may be combined together, or sub-RUs in four sub-channels may be combined together. In the first channel, sub-RUs corresponding to different RUs in a single sub-channel may be combined. The combined sub-channels in embodiments of this application may be referred to as a sub-channel combination.

Figure 5:
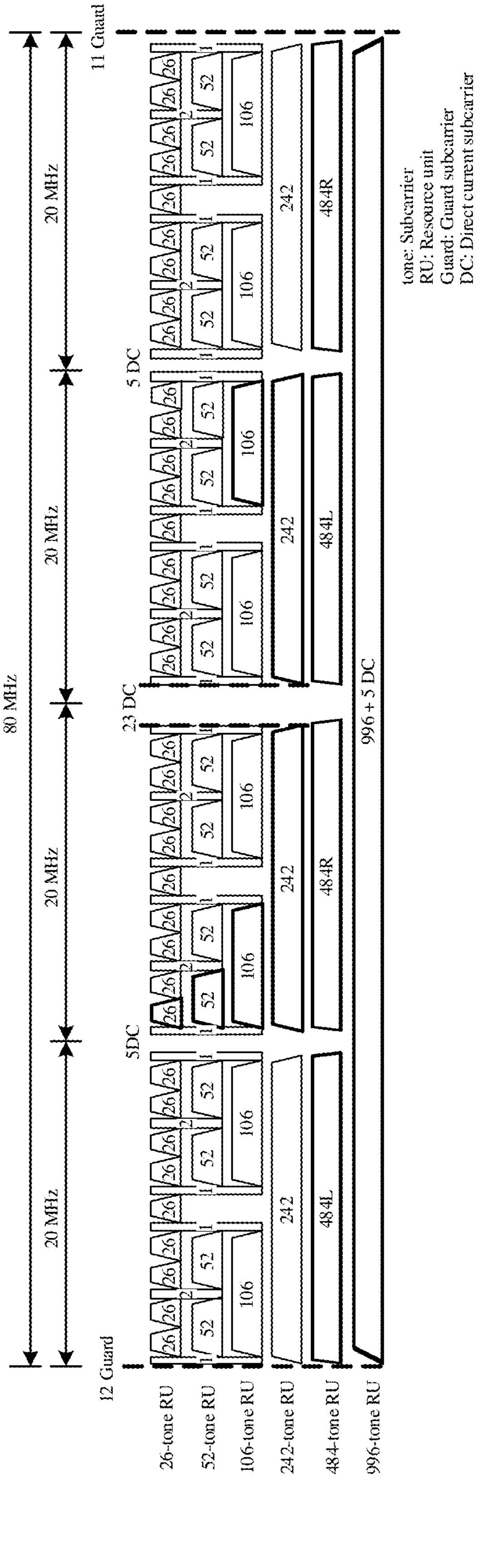
FIG. 5 is a schematic diagram of RU distribution according to an embodiment of this application.

With reference to FIG. 5 and Table 2, the following lists subcarrier ranges of RUs on the first channel and locations of pilot subcarriers when the second preset bandwidth is 80 MHz.

FIG. 5 is a schematic diagram of RU distribution according to this embodiment of this application. As shown in FIG. 5, the bandwidth of the first channel is 80 MHz, the first channel includes four sub-channels, a bandwidth of each sub-channel is 20 MHz, the sub-channel includes one or more RUs, and each RU may be any one of the foregoing 26-tone RU, 52-tone RU, 106-tone RU, or the 242-tone RU. Table 2 shows distribution of indexes, subcarrier ranges, and locations of pilot subcarriers of the resource units on the channel shown in FIG. 5.

For ease of description, in this application, a subcarrier whose index is x is represented as a subcarrier x. A RU whose index is y is represented as a RU y.

As shown in Table 2, the first channel includes 1024 subcarriers in total, and indexes are −512, . . . , 0, . . . , 511. [a, b] represents a subcarrier range of a RU from a to b, including a and b, {x, y, . . . } represents pilot subcarriers with corresponding indexes, and a quantity of digits in { } represents a quantity of pilot subcarriers.

For the 26-tone RU, a RU 1 to a RU 9 correspond to the first 20 MHz sub-channel, a RU 10 to a RU 18 correspond to the second 20 MHz sub-channel, a RU 19 to a RU 27 correspond to the third 20 MHz sub-channel, and a RU 28 to a RU 36 correspond to the fourth 20 MHz sub-channel.

The 26-tone RU in the bandwidth may be any one of the RU 1 to the RU 9 in a row corresponding to the 26-tone RU in Table 2, and each 26-tone RU includes two pilot subcarriers.

For example, the 26-tone RU in the bandwidth is the RU 1 in the row corresponding to the 26-tone RU in Table 2, and a subcarrier range of the 26-tone RU is from a subcarrier −499 to a subcarrier −474. A subcarrier −494 and a subcarrier −480 are pilot subcarriers.

For the 52-tone RU, a RU 1 to a RU 4 correspond to the first 20 MHz sub-channel, a RU 5 to a RU 8 correspond to the second 20 MHz sub-channel, a RU 9 to a RU 12 correspond to the third 20 MHz sub-channel, and a RU 13 to a RU 16 correspond to the fourth 20 MHz sub-channel. Each 52-tone RU includes four pilot subcarriers.

The 52-tone RU in the bandwidth may be any one of the RU 1 to the RU 4 in a row corresponding to the 52-tone RU in Table 2, and each 52-tone RU includes four pilot subcarriers.

For example, the 52-tone RU in the bandwidth is the RU 1 in the row corresponding to the 52-tone RU in Table 2, and a subcarrier range of the 52-tone RU is from a subcarrier −499 to a subcarrier −448. A subcarrier −494, a subcarrier −480, a subcarrier −468, and a subcarrier −454 are pilot subcarriers.

For the 106-tone RU, a RU 1 and a RU 2 correspond to the first 20 MHz sub-channel, a RU 3 and a RU 4 correspond to the second 20 MHz sub-channel, a RU 5 and a RU 6 correspond to the third 20 MHz sub-channel, and a RU 7 and a RU 8 correspond to the fourth 20 MHz sub-channel.

The 106-tone RU in the bandwidth may be any one of the RU 1 and the RU 2 in a row corresponding to the 106-tone RU in Table 2, and each 106-tone RU includes four pilot subcarriers.

For example, the 106-tone RU in the bandwidth is the RU 1 in the row corresponding to the 106-tone RU in Table 2, and a subcarrier range of the 106-tone RU is from a subcarrier −499 to a subcarrier −394. A subcarrier −494, a subcarrier −468, a subcarrier −426, and a subcarrier −400 are pilot subcarriers.

Likewise, the 242-tone RU in the bandwidth is a RU 1 in a row corresponding to the 242-tone RU in Table 2, a subcarrier range of the 242-tone RU is from a subcarrier −500 to a subcarrier −259. A subcarrier −494, a subcarrier −468, a subcarrier −426, a subcarrier −400, a subcarrier −360, a subcarrier −334, a subcarrier −292, and a subcarrier −266 are pilot subcarriers.

Likewise, the 484-tone RU in the bandwidth is a RU 1 in a row corresponding to the 484-tone RU in Table 2, and a subcarrier range of the 484-tone RU is from a subcarrier −500 to a subcarrier −259 and from a subcarrier −253 to a subcarrier −12. A subcarrier −494, a subcarrier −468, a subcarrier −426, a subcarrier −400, a subcarrier −360, a subcarrier −334, a subcarrier −292, a subcarrier −266, a subcarrier −246, a subcarrier −220, a subcarrier −178, a subcarrier −152, a subcarrier −112, a subcarrier −86, a subcarrier −44, and a subcarrier −18 are pilot subcarriers.

Likewise, the 996-tone RU in the bandwidth is a RU 1 in a row corresponding to the 996-tone RU in Table 2, and a subcarrier range of the 996-tone RU is from a subcarrier −500 to a subcarrier −3 and from a subcarrier 3 to a subcarrier 500. A subcarrier −468, a subcarrier −400, a subcarrier −334, a subcarrier −266, a subcarrier −220, a subcarrier −152, a subcarrier −86, a subcarrier −18, a subcarrier 18, a subcarrier 86, a subcarrier 152, a subcarrier 220, a subcarrier 266, a subcarrier 334, a subcarrier 400, and a subcarrier 468 are pilot subcarriers.

TABLE 2

RU indexes and subcarrier ranges of the RUs on the 80 MHz channel

| RU type | RU index, subcarrier range, and pilot subcarrier location | | | | |
|---|---|---|---|---|---|
| 26-tone RU | RU 1<br>[−499:−474]<br>{−494, −480} | RU 2<br>[−473:−448]<br>{−468, −454} | RU 3<br>[−445:−420]<br>{−440, −426} | RU 4<br>[−419:−394]<br>{−414, −400} | RU 5<br>[−392:−367]<br>{−386, −372} |
| | RU 6<br>[−365:−340]<br>{−360, −346} | RU 7<br>[−339:−314]<br>{−334, −320} | RU 8<br>[−311:−286]<br>{−306, 292} | RU 9<br>[−285:−260]<br>{−280, −266} | |
| | RU 10<br>[−252:−227]<br>{−246, −232} | RU 11<br>[−226:−201]<br>{−220, −206} | RU 12<br>[−198:−173]<br>{−192, −178} | RU 13<br>[−172:−147]<br>{−166, −152} | RU 14<br>[−145:−120]<br>{−140, −126} |
| | RU 15<br>[−118:−93]<br>{−112, −98} | RU 16<br>[−92:−67]<br>{−86, −72} | RU 17<br>[−64:−39]<br>{−58, −44} | RU 18<br>[−38:−13]<br>{−32, −18} | |
| | RU 19<br>[13:38]<br>{18, 32} | RU 20<br>[39:64]<br>{44, 58} | RU 21<br>[67:92]<br>{72, 86} | RU 22<br>[93:118]<br>{98, 112} | RU 23<br>[120:145]<br>{126, 140} |
| | RU 24<br>[147:172]<br>{152, 166} | RU 25<br>[173:198]<br>{178, 192} | RU 26<br>[201:226]<br>{206, 220} | RU 27<br>[227:252]<br>{232, 246} | |
| | RU 28<br>[260:285]<br>{266, 280} | RU 29<br>[286:311]<br>{292, 306} | RU 30<br>[314:339]<br>{320, 334} | RU 31<br>[340:365]<br>{346, 360} | RU 32<br>[367:392]<br>{372, 386} |
| | RU 33<br>[394:419]<br>{400, 414} | RU 34<br>[420:445]<br>{426, 440} | RU 35<br>[448:473]<br>{454, 468} | RU 36<br>[474:499]<br>{480, 494} | |
| 52-tone RU | RU 1<br>[−499:−448]<br>{−494, −480, −468, −454} | RU 2<br>[−445:−394]<br>{−440, −426, −414, −400} | RU 3<br>[−365:−314]<br>{−360, −346, −334, −320} | RU 4<br>[−311:−260]<br>{−306, −292, −280, −266} | |
| | RU 5<br>[−252:−201]<br>{−246, −232, −220, −206} | RU 6<br>[−198:−147]<br>{−192, −178, −166, −152} | RU 7<br>[−118:−67]<br>{−112, −98, −86, −72} | RU 8<br>[−64:−13]<br>{−58, −44, −32, −18} | |
| | RU 9<br>[13:64]<br>{18, 32, 44, 58} | RU 10<br>[67:118]<br>{72, 86, 98, 112} | RU 11<br>[147:198]<br>{152, 166, 178, 192} | RU 12<br>[201:252]<br>{206, 220, 232, 246} | |
| | RU 13<br>[260:311]<br>{266, 280, 292, 306} | RU 14<br>[314:365]<br>{320, 334, 346, 360} | RU 15<br>[394:445]<br>{400, 414, 426, 440} | RU 16<br>[448:499]<br>{454, 468, 480, 494} | |
| 106-tone RU | RU 1<br>[−499:−394]<br>{−494, −468, −426, −400} | RU 2<br>[−365:−260]<br>{−360, −334, −292, −266} | RU 3<br>[−252:−147]<br>{−246, −220, −178, −152} | RU 4<br>[−118:−13]<br>{−112, −86, −44, −18} | |
| | RU 5<br>[13:118]<br>{18, 44, 86, 112} | RU 6<br>{152, 178, 220, 246}<br>[147:252] | RU 7<br>{266, 292, 334, 360}<br>[260:365] | RU 8<br>{400, 426, 468, 494}<br>[394:499] | |
| 242-tone RU | RU 1<br>[−500:−259]<br>{−494, −468, −426, −400, −360, −334, −292, −266} | | RU 2<br>[−253:−12]<br>{−246, −220, −178, −152, −112, −86, −44, −18} | | |
| | RU 3<br>[12:253]<br>{18, 44, 86, 112, 152, 178, 220, 246} | | RU 4<br>[259:500]<br>{266, 292, 334, 360, 400, 426, 468, 494} | | |

TABLE 2-continued

RU indexes and subcarrier ranges of the RUs on the 80 MHz channel

| RU type | RU index, subcarrier range, and pilot subcarrier location |
|---|---|
| 484-tone RU | RU 1<br>[−500:−259, −253:−12]<br>{−494, −468, −426, −400, −360, −334, −292, −266, −246, −220, −178, −152, −112, −86, −44, −18}<br>RU 2<br>[12:253, 259:500]<br>{18, 44, 86, 112, 152, 178, 220, 246, 266, 292, 334, 360, 400, 426, 468, 494} |
| 996-tone RU | RU 1<br>[−500:−3, 3:500]<br>{−468, −400, −334, −266, −220, −152, −86, −18, 18, 86, 152, 220, 266, 334, 400, 468} |

The second preset bandwidth may be 80 MHz, the first preset bandwidth may be greater than or equal to the second preset bandwidth, and the second preset bandwidth may be obtained by dividing the first preset bandwidth.

For example, a channel with a bandwidth of 160 MHz or 320 MHz may be divided into two or four 80 MHz channels. Subcarrier ranges and pilot subcarrier indexes of RUs on the channel with the bandwidth of 160 MHz or 320 MHz may be obtained through computing based on index distribution on the 80 MHz channel.

Specifically, when the bandwidth is 160 MHz or more, for the 26-tone RU/52-tone RU/106-tone RU/242-tone RU/484-tone RU/996-tone RU, a subcarrier range is from [80 MHz index]−512 to [40 MHz index]+512 when the bandwidth is 160 MHz; and from [160 MHz index]−1024 to [160 MHz index]+1024 when the bandwidth is 320 MHz.

For example, if a pilot index of an 80 MHz 996-tone RU is P996, for an n*996-tone RU, where n is a positive integer greater than 1, and a pilot index of the n*996-tone RU is as follows.

When the bandwidth is 160 MHz, a pilot index of a 1*996-tone RU is {P996−512}, {P996+512}; and a pilot index of a 2*996-tone RU is {P996−512, P996+512}.

When the bandwidth is 320 MHz, a pilot index of a 1*996-tone RU is {P996−1536}, {P996−512}, {P996+512}, {P996+1536}; a pilot index of a 2*996-tone RU is {P996−1536, P996−512}, {P996+512, P996+1536}; and a pilot index of a 4*996-tone RU is {P996−1536, P996−512, P996+512, P996+1536}.

Further, the discrete resource unit in this embodiment of this application may include a plurality of sub-RUs, and the plurality of sub-RUs may include a plurality of discontiguous sub-RUs in an unpunctured sub-channel in the first channel. In other words, single sub-channel RU spreading (single sub-channel RU spreading, SS-RU) is performed on the unpunctured channel. The plurality of sub-RUs in the discrete resource unit may further include a plurality of sub-RUs in a plurality of unpunctured sub-channels in the first channel. In other words, multiple sub-channels RU spreading (multiple sub-channels RU spreading, MS-RU) is performed on the plurality of unpunctured sub-channels.

In this embodiment of this application, the discrete resource unit included in the PPDU may be determined based on a combination of the sub-channels included in the first channel and a puncture status of the sub-channels in the first channel. Specifically, refer to the following description of Case 1, Case 2, or Case 3.

S402: The transmit end sends the PPDU to the receive end.

In a possible design, in non-trigger-based (non-trigger-based) transmission, a preamble field of the PPDU carries resource scheduling information.

In this possible design, the transmit end may be an AP, and the receive end may be a STA; or the transmit end is a STA, and the receive end is an AP.

The resource scheduling information indicates the one or more discrete resource units, the sub-resource unit includes a plurality of subcarriers, and the resource scheduling information includes an index of a RU corresponding to the discrete resource unit and an index of a subcarrier included in the sub-resource unit. Further, the resource scheduling information further includes RU distribution type indication information, and the RU distribution type indication information indicates that the receive end uses MS-RU or SS-RU.

Figure 6:
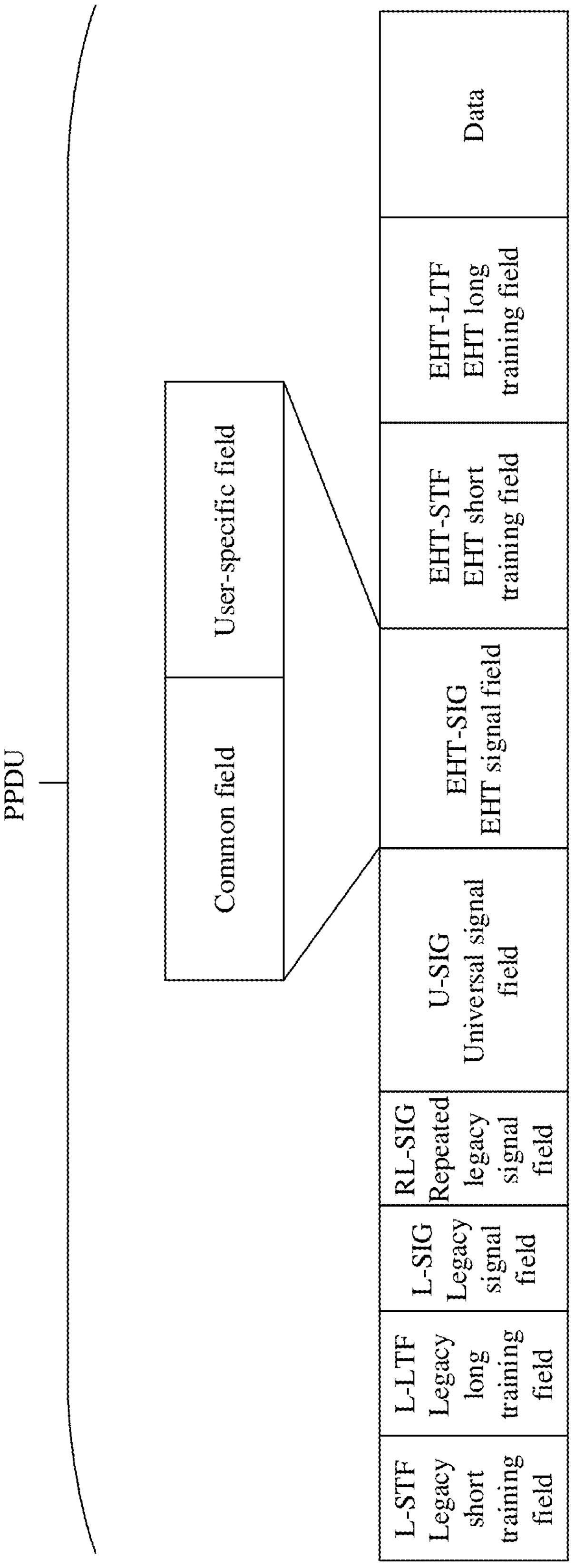
FIG. 6 is a schematic diagram of a structure of a PPDU according to an embodiment of this application.

The preamble field may include an ultra-high throughput signal field or an extremely high throughput signal (extremely high throughput, EHT-SIG) field, a legacy short training field (legacy short training field, L-STF), a legacy long training field (legacy long training field, L-LTF), a legacy signal field (legacy signal field, L-SIG), a repeated legacy signal (RL-SIG) field, a U-SIG, an EHT-SIG, an EHT short training field (EHT-STF), an EHT long training field (EHT-LTF), and data (data). The L-STF, L-LTF, L-SIG, RL-SIG, and universal signal field (universal SIG, U-SIG), EHT-STF, and EHT-LTF each are a part of a structure of the preamble of the PPDU. FIG. 6 is a schematic diagram of the structure of the PPDU according to this embodiment of this application.

The L-STF, the L-LTF, and the L-SIG may be understood as legacy preamble fields, and are used to ensure coexistence of a new device and a legacy device. The RL-SIG is used to enhance reliability of a legacy signal field. The U-SIG and the EHT-SIG are signal fields. The U-SIG is used to carry some common information. The EHT-SIG includes resource allocation information, user information, information indicating data demodulation, and the like. The EHT-SIG may indicate that the EHT-STF, the EHT-LTF, and the data field are transmitted based on a discrete resource unit. In this way, it is convenient for the receive end to receive the EHT-STF, the EHT-LTF, and the data field transmission in a discrete resource unit receiving manner.

In this case, the discrete resource unit is for non-trigger-based transmission, and the resource scheduling information may be carried in the ultra-high throughput signal field or the extremely high throughput signal (extremely high throughput, EHT-SIG) field. In this case, the EHT PPDU is referred to as an ultra-high throughput signal field or an extremely high throughput multi-user physical protocol data unit (extremely high throughput multi-user physical protocol data unit, EHT MU PPDU). A specific structure of the EHT MU PPDU is shown in FIG. 6. The EHT MU PPDU may be for downlink transmission, or may be for uplink transmission. The downlink transmission may be for downlink multi-user transmission or downlink single-user transmission.

For example, in a downlink multi-user transmission scenario, an AP sends the PPDU to a STA, and a signal field of the PPDU includes RU distribution type indication information. The signal field of the PPDU includes U-SIG and EHT-SIG. The EHT-SIG includes a public field and a user-specific field.

For example, a U-SIG or EHT-SIG common field includes the RU distribution type indication information that indicates that all STAs use the MS-RU or use the SS-RU. In this way, a STA can read resource unit allocation information based on a correspondence between the MS-RU or the SS-RU and a subcarrier, so as to accurately obtain a subcarrier range of a resource unit allocated to the STA.

For example, the EHT-SIG user field includes the RU distribution type indication information that indicates that a STA corresponding to the user field uses the MS-RU or the SS-RU. In this way, the bandwidth can support hybrid transmission of the MS-RU and the SS-RU, that is, a user may use the MS-RU or the SS-RU to obtain transmission resources. In addition, the RU distribution type indication information in the EHT-SIG user field enables the STA to determine to use the MS-RU or the SS-RU, and the STA (for example, the STA) can read resource unit allocation information based on a correspondence between the MS-RU or the SS-RU and a subcarrier, so as to accurately obtain a subcarrier range of the resource unit allocated to the STA.

In another possible design, in trigger (trigger based) transmission, the discrete resource unit is for transmitting uplink data. Before S402 is performed, the transmit end receives a trigger frame from the receive end, where the trigger frame carries resource scheduling information.

For descriptions related to the resource scheduling information, refer to the foregoing possible designs, and details are not described again.

In this possible design, the transmit end is a STA, and the receive end is an AP.

When the discrete resource unit is for trigger-based transmission, the resource scheduling information is carried in the trigger frame, and the transmit end receives the trigger frame before sending the PPDU. In this case, the EHT PPDU is referred to as an ultra-high throughput signal field or an extremely high throughput trigger based physical protocol data unit (extremely high throughput trigger based physical protocol data unit, EHT TB PPDU), and does not include EHT-SIG carrying resource scheduling information.

For example, in an uplink multi-user transmission scenario, the STA receives the trigger frame from the AP, where the trigger frame carries RU distribution type indication information. The trigger frame includes a common field and a user information list field.

For example, the common field in the trigger frame includes the RU distribution type indication information. In this way, the STA can be indicated to use MS-RU or SS-RU, so that the receive end can obtain resource unit allocation information based on a correspondence between the MS-RU or the SS-RU and a subcarrier.

For example, the trigger frame includes the user information list field, the user information list field includes one or more user fields, and the user field includes the RU distribution type indication information that indicates that a STA corresponding to the user field uses MS-RU or SS-RU. The bandwidth can support hybrid transmission of the MS-RU and the SS-RU, that is, a user may use the MS-RU or the SS-RU to obtain transmission resources. In addition, the RU distribution type indication information in the user field enables the STA to determine to use the MS-RU or the SS-RU, and the STA can read resource unit allocation information based on a correspondence between the MS-RU or the SS-RU and a subcarrier, so as to accurately obtain a subcarrier range of the resource unit allocated to the STA.

The resource scheduling information further includes a channel puncture status. For example, a preamble puncture indication is set in a RU configuration field in the U-SIG or the EHT-SIG. The indication may indicate that one sub-channel is punctured, or two sub-channels are punctured. The punctured sub-channel cannot be for transmitting the PPDU.

S403: The receive end receives the PPDU from the transmit end.

Further, after receiving the PPDU, the receive end performs data processing on the PPDU, to determine a resource unit allocation status.

Based on the method shown in FIG. 4, the discrete RU can be allocated to a user at the receive end, and a plurality of discrete sub-RUs in frequency domain can be allocated to one user, so that each user has a more flexible allocated frequency domain resource, and is not limited to having one or two contiguous frequency domain resources. The frequency domain resource can be more fully utilized, and a frequency range covered by a subcarrier of a single RU is wider. This can improve transmit power of the transmit end, power of a subcarrier of a unit, and an equivalent signal-to-noise ratio of the receive end.

It should be understood that the communication method is described by using an embodiment in which the AP sends the resource scheduling information to the STA. The method is also applicable to a scenario in which an AP sends resource scheduling information to an AP and a scenario in which a STA sends resource scheduling information to a STA.

The following describes in detail several cases involved in the method shown in FIG. 4.

Case 1: The first channel includes a first sub-channel combination and a second sub-channel combination; and if the first sub-channel combination has one punctured sub-channel, and the second sub-channel combination has no punctured sub-channel, the plurality of discrete resource units include a first discrete resource unit and a second discrete resource unit, the first discrete resource unit includes sub-resource units corresponding to different RUs in unpunctured sub-channels in the first sub-channel combination, and the second discrete resource unit is a discrete resource unit corresponding to the second sub-channel combination.

The first discrete resource unit may include a discrete resource unit obtained after SS-RU is performed on an unpunctured sub-channel, and the second discrete resource unit may include a discrete resource unit obtained after MS-RU is performed on an unpunctured sub-channel. With reference to the accompanying drawings, the following describes MS-RU or SS-RU resource distribution on sub-channels in a puncture case.

For example, in this embodiment of this application, the bandwidth of the first channel is 80 MHz. The first channel includes four sub-channels with a bandwidth of 20 MHz. For ease of description, the four sub-channels are denoted as a CH 1, a CH 2, a CH 3, and a CH 4 in ascending order of frequencies.

Specifically, an example in which each sub-channel combination includes two sub-channels is used to describe the MS-RU or the SS-RU resource distribution on the sub-channels. For example, the first sub-channel combination includes the CH 1 and the CH 2, and the second sub-channel combination includes the CH 3 and the CH 4.

Figure 7A:
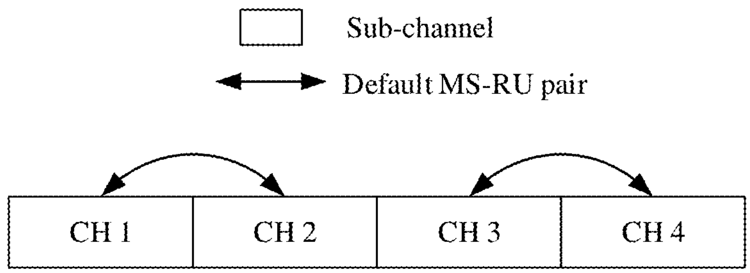
FIG. 7*a* is a schematic diagram of another RU distribution according to an embodiment of this application.

FIG. 7*a* is a schematic diagram of another RU distribution according to this embodiment of this application. As shown in FIG. 7*a*, the CH 1 and the CH 2 form the first sub-channel combination, and RUs corresponding to the CH 1 and the CH 2 may form a first MS-RU pair. The CH 3 and the CH 4 form the second sub-channel combination, and RUs corresponding to the CH 3 and the CH 4 may form a second MS-RU pair. The following describes specific distribution of the channel combinations in FIG. 7*a* on the first channel with reference to FIG. 7*b*.

Figure 7B:
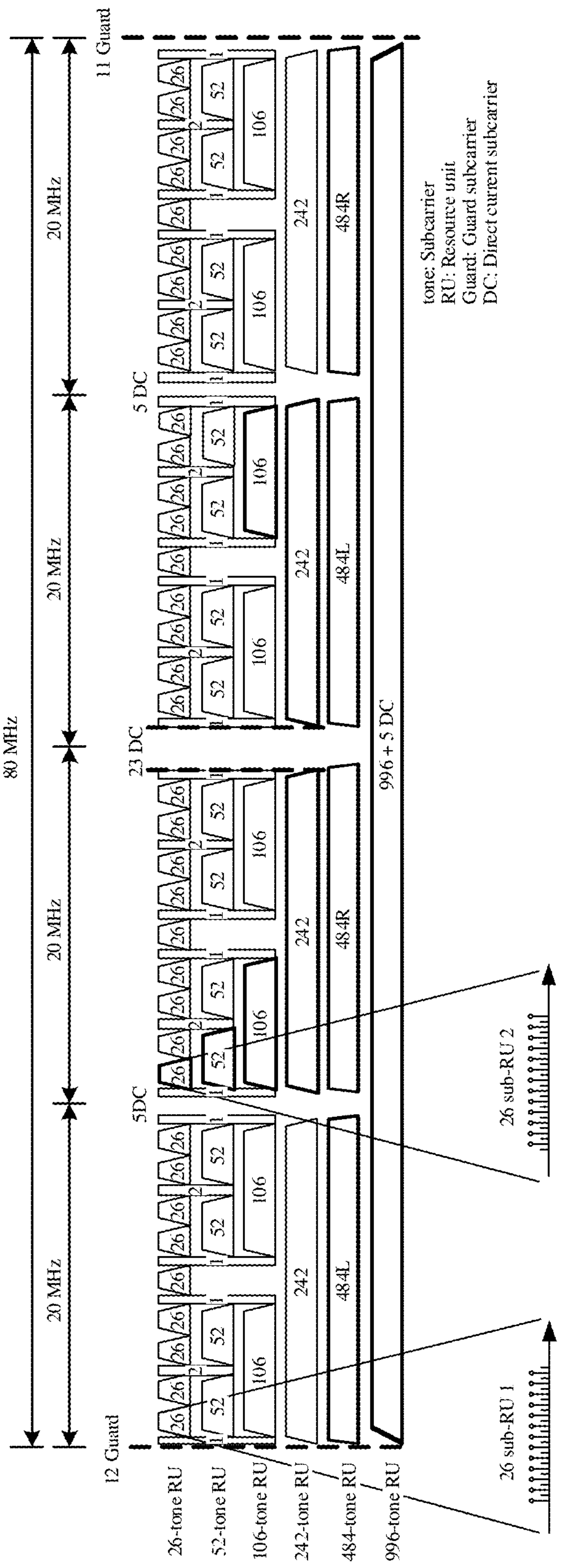
FIG. 7*b* is a schematic diagram of another RU distribution according to an embodiment of this application.

FIG. 7*b* is a schematic diagram of another RU distribution according to this embodiment of this application. As shown in FIG. 7*b*, a bandwidth of a first channel is 80 MHz, the first channel includes four 20 MHz sub-channels, for example, a CH 1, a CH 2, a CH 3, and a CH 4, and any two sub-channels are combined for MS-RU. A 26-tone RU is divided into an odd-numbered sub-RU and an even-numbered sub-RU based on a subcarrier index, for example, a 26 sub-RU 1 and a 26 sub-RU 2. Each sub-RU includes 13 subcarriers, and each sub-RU is on a different 20 MHz sub-channel, for example, the 26 sub-RU 1 is on the CH 1, and a 26 sub-RU 2 is on the CH 2. There is a spacing of one subcarrier between every pair of adjacent subcarriers in each sub-RU in a discrete resource unit. According to resource allocation shown in FIG. 7*b*, 26-tone RUs whose original frequency span is 2 MHz may be distributed to a frequency range of 4 MHz. The following describes the RU allocation in FIG. 7*b* with reference to Table 3.

Table 3 shows RU indexes and subcarrier ranges when MS-RU is performed on a pairwise combination on an 80 MHz sub-channel. As shown in Table 3, for a 26-tone RU, a RU 1 and a RU 10, a RU 19 and a RU 28, and the like respectively form an MS-RU pair. For a 52-tone RU, a RU 1 and a RU 5, a RU 9 and a RU 13 respectively form an MS-RU pair. For a 106-tone RU, a RU 1 and a RU 3, a RU 5 and a RU 7 respectively form an MS-RU pair. For a 242-tone RUs, a RU 1 and a RU 2, and a RU 3 and a RU 4 form an MS-RU pair. It may be considered to discrete a 484-tone RU when the bandwidth is greater than 80 MHz. It may be considered not to discrete a larger RU.

It should be noted that in this embodiment of this application, [a:m:b]&[c:m:d] represents a discrete sequence of {a, a+m, . . . , b−m, b} plus a discrete sequence of {c, c+m, . . . , d−m, d}.

Each RU is divided into two sub-RUs. A first sub-RU includes odd-numbered sub-carriers in a first half of the RU and even-numbered sub-carriers in a second half of the RU, and a second sub-RU includes even-numbered sub-carriers in the first half of the channel and odd-numbered sub-carriers in the second half of the channel.

The 26-tone RU on the CH 1 is a RU 1 in a row corresponding to the 26-tone RU in Table 3, and a subcarrier range of the 26-tone RU may be divided into the 26 sub-RU 1 and the 26 sub-RU 2 based on a subcarrier index. A subcarrier range of the 26 sub-RU 1 is [−499:2:−487]&[−484:2:−474], and a subcarrier −480 is a pilot subcarrier. A subcarrier range of the 26 sub-RU 2 is [−498:2:−486]&[−485:2:−475], and a subcarrier 494 is a pilot subcarrier.

The 26-tone RU on the CH 2 is a RU 10 in a row corresponding to the 26-tone RU in Table 3, and a subcarrier range of the 26-tone RU may be divided into a 26 sub-RU 3 and a 26 sub-RU 4 based on a subcarrier index. A subcarrier range of the 26 sub-RU 3 is [−252:2:−240]&[−237:2:−227], and a subcarrier −246 is a pilot subcarrier. A subcarrier range of the 26 sub-RU 4 is [−251:2:−239]&[−238:2:−228], and a subcarrier −232 is a pilot subcarrier.

The CH 1 and the CH 2 form the first sub-channel combination, the RU 1 in the CH 1 and the RU 10 in the CH 2 are an MS-RU pair, and discrete resource units DRU 1 and DRU 10 are obtained after MS-RU is performed on the CH 1 and the CH 2. A subcarrier range of the DRU 1 is [−499:2:−487]&[−484:2:−474]&[−252:2:−240]&[−237:2:−227], and a subcarrier −246 and a subcarrier −480 are pilot subcarriers. A subcarrier range of the DRU 10 is [−498:2:−486]&[−485:2:−475]&[−251:2:−239]&[−238:2:−228], and a subcarrier −494 and a subcarrier −232 are pilot subcarriers.

In Table 3, for processes in which pairwise sub-channel combination MS-RU is performed on the 52-tone RU, the 106-tone RU, and the 242-tone RU, refer to that of the 26-tone RU, and details are not described again.

TABLE 3

RU indexes and subcarrier ranges when MS-RU is performed on the pairwise combination on the 80 MHz sub-channel

| RU type | RU index, subcarrier range, and pilot subcarrier location | | | | |
|---|---|---|---|---|---|
| 26-tone RU | RU 1<br>[−499:2:−487]&<br>[−484:2:−474]&<br>[−252:2:−240]&<br>[−237:2:−227]<br>{−246, −480} | RU 2<br>[−473:2:−461]&<br>[−458:2:−448]&<br>[−226:2:−214]&<br>[−211:2:−201]<br>{−220, −454} | RU 3<br>[−445:2:−433]&<br>[−430:2:−420]&<br>[−198:2:−186]&<br>[−183:2:−173]<br>{−192, −426} | RU 4<br>[−419:2:−407]&<br>[−404:2:−394]&<br>[−172:2:−160]&<br>[−157:2:−147]<br>{−166, −400} | RU 5<br>[−392:2:−380]&<br>[−377:2:−367]&<br>[−145:2:−133]&<br>[−132:2:−120]<br>{−386, −126} |
| | RU 6<br>[−365:2:−353]&<br>[−350:2:−340]&<br>[−118:2:−106]&<br>[−103:2:−93]<br>{−112, −346} | RU 7<br>[−339:2:−327]&<br>[−324:2:−314]&<br>[−92:2:−80]&<br>[−77:2:−67]<br>{−86, −320} | RU 8<br>[−311:2:−299]&<br>[−296:2:−286]&<br>[−64:2:−52]&<br>[−49:2:−39]<br>{−58, −292} | RU 9<br>[−285:2:−273]&<br>[−270:2:−260]&<br>[−38:2:−26]&<br>[−23:2:−13]<br>{−32, −266} | |
| | RU 10<br>[−498:2:−486]&<br>[−485:2:−475]&<br>[−251:2:−239]&<br>[−238:2:−228]<br>{−494, −232} | RU 11<br>[−472:2:−460]&<br>[−459:2:−449]&<br>[−225:2:−213]&<br>[−212:2:−202]<br>{−468, −206} | RU 12<br>[−444:2:−432]&<br>[−431:2:−421]&<br>[−197:2:−185]&<br>[−184:2:−174]<br>{−440, −178} | RU 13<br>[−418:2:−406]&<br>[−405:2:−395]&<br>[−171:2:−159]&<br>[−158:2:−148]<br>{−414, −152} | RU 14<br>[−391:2:−379]&<br>[−378:2:−368]&<br>[−144:2:−134]&<br>[−131:2:−121]<br>{−140, −372} |
| | RU 15<br>[−364:2:−352]& | RU 16<br>[−338:2:−326]& | RU 17<br>[−310:2:−298]& | RU 18<br>[−284:2:−272]& | |

TABLE 3-continued

RU indexes and subcarrier ranges when MS-RU is performed on the pairwise combination on the 80 MHz sub-channel

| RU type | RU index, subcarrier range, and pilot subcarrier location | | | | |
|---|---|---|---|---|---|
| | [−351:2:−341]&<br>[−117:2:−105]&<br>[−104:2:−94]<br>{−360, −98} | [−325:2:−315]&<br>[−91:2:−79]&<br>[−78:2:−68]<br>{−334, −72} | [−297:2:−287]&<br>[−63:2:−51]&<br>[−50:2:−40]<br>{−306, −44} | [−271:2:−261]&<br>[−37:2:−25]&<br>[−24:2:−14]<br>{−280, −18} | |
| | RU 19<br>[13:2:25]&<br>[28:2:38]&<br>[260:2:272]&<br>[275:2:285]<br>{266, 32} | RU 20<br>[39:2:51]&<br>[54:2:64]&<br>[286:2:298]&<br>[301:2:311]<br>{292, 58} | RU 21<br>[67:2:79]&<br>[82:2:92]&<br>[314:2:326]&<br>[329:2:339]<br>{320, 86} | RU 22<br>[93:2:105]&<br>[108:2:118]&<br>[340:2:352]&<br>[355:2:365]<br>{346, 112} | RU 23<br>[120:2:132]&<br>[135:2:145]&<br>[367:2:379]&<br>[382:2:392]<br>{126, 386} |
| | RU 24<br>[147:2:159]&<br>[162:2:172]&<br>[394:2:406]&<br>[409:2:419]<br>{400, 166} | RU 25<br>[173:2:185]&<br>[188:2:198]&<br>[420:2:432]&<br>[435:2:445]<br>{426, 192} | RU 26<br>[201:2:213]&<br>[216:2:226]&<br>[448:2:460]&<br>[463:2:473]<br>{454, 220} | RU 27<br>[227:2:239]&<br>[242:2:252]&<br>[474:2:486]&<br>[489:2:499]<br>{480, 246} | |
| | RU 28<br>[14:2:26]&<br>[27:2:37]&<br>[261:2:273]&<br>[274:2:284]<br>{18, 280} | RU 29<br>[40:2:52]&<br>[53:2:63]&<br>[287:2:299]&<br>[300:2:310]<br>{44, 306} | RU 30<br>[68:2:80]&<br>[81:2:91]&<br>[315:2:327]&<br>[328:2:338]<br>{72, 334} | RU 31<br>[94:2:106]&<br>[107:2:117]&<br>[341:2:353]&<br>[354:2:364]<br>{98, 360} | RU 32<br>[121:2:133]&<br>[134:2:144]&<br>[368:2:380]&<br>[381:2:391]<br>{372, 140} |
| | RU 33<br>[148:2:160]&<br>[161:2:171]&<br>[395:2:407]&<br>[408:2:418]<br>{152, 414} | RU 34<br>[174:2:186]&<br>[187:2:197]&<br>[421:2:433]&<br>[434:2:444]<br>{178, 440} | RU 35<br>[202:2:214]&<br>[215:2:225]&<br>[449:2:461]&<br>[462:2:472]<br>{206, 468} | RU 36<br>[228:2:240]&<br>[241:2:251]&<br>[475:2:487]&<br>[488:2:498]<br>{232, 494} | |
| 52-tone RU | RU 1<br>[−499:2:−475]&<br>[−472:2:−448]&<br>[−252:2:−228]&<br>[−225:2:−201]<br>{−246, −232, 468, −454} | RU 2<br>[−445:2:−421]&<br>[−418:2:−394]&<br>[−198:2:−174]&<br>[−171:2:−147]<br>{−192, −178, −414, −400} | RU 3<br>[−365:2:−341]&<br>[−338:2:−314]&<br>[−118:2:−94]&<br>[−91:2:−67]<br>{−112, −98, −334, −320} | RU 4<br>[−311:2:−287]&<br>[−284:2:−260]&<br>[−64:2:−40]&<br>[−37:2:−13]<br>{−58, −44, −280, −266} | |
| | RU 5<br>[−498:2:−474]&<br>[−473:2:−449]&<br>[−251:2:−227]&<br>[−226:2:−202]<br>{−494, −480, −220, −206} | RU 6<br>[−444:2:−420]&<br>[−419:2:−395]&<br>[−197:2:−173]&<br>[−174:2:−148]<br>{−440, −426, −166, −152} | RU 7<br>[−364:2:−340]&<br>[−339:2:−315]&<br>[−117:2:−93]&<br>[−92:2:−68]<br>{−360, −346, −86, −72} | RU 8<br>[−310:2:−286]&<br>[−285:2:−261]&<br>[−63:2:−39]&<br>[−38:2:−14]<br>{−306, −292, −32, −18} | |
| | RU 9<br>[13:2:37]&<br>[40:2:64]&<br>[260:2:284]&<br>[287:2:311]<br>{266, 280, 44, 58} | RU 10<br>[67:2:91]&<br>[94:2:118]&<br>[314:2:338]&<br>[341:2:365]<br>{320, 334, 98, 112} | RU 11<br>[147:2:171]&<br>[174:2:198]&<br>[394:2:418]&<br>[421:2:445]<br>{400, 414, 178, 192} | RU 12<br>[201:2:225]&<br>[228:2:252]&<br>[448:2:472]&<br>[475:2:499]<br>{454, 468, 232, 246} | |
| | RU 13<br>[14:2:38]&<br>[39:2:63]&<br>[261:2:285]<br>[286:2:310]<br>{18, 32, 292, 306} | RU 14<br>[68:2:92]&<br>[93:2:117]&<br>[315:2:339]&<br>[340:2:364]<br>{72, 86, 346, 360} | RU 15<br>[148:2:172]&<br>[173:2:197]&<br>[395:2:419]&<br>[420:2:444]<br>{152, 166, 426, 440} | RU 16<br>[202:2:226]&<br>[227:2:251]&<br>[449:2:473]&<br>[474:2:498]<br>{206, 220, 480, 494} | |
| 106-tone RU | RU 1<br>[−499:2:−447]&<br>[−444:2:−394]&<br>[−252:2:−200]&<br>[−197:2:−147]<br>{−246, −220, −426, −400} | RU 2<br>[−365:2:−313]&<br>[−310:2:−260]&<br>[−118:2:−66]&<br>[−63:2:−13]<br>{−112, −86, −292, −266} | RU 3<br>[−498:2:−446]&<br>[−445:2:−395]&<br>[−251:2:−199]&<br>[−198:2:−148]<br>{−494, −468, −178, −152} | RU 4<br>[−364:2:−312]&<br>[−311:2:−261]&<br>[−117:2:−65]&<br>[−64:2:−14]<br>{−360, −334, −44, −18} | |
| | RU 5<br>[13:2:65]&<br>[68:2:118]&<br>[260:2:312]&<br>[315:2:365]<br>{266, 292, 86, 112} | RU 6<br>[147:2:199]&<br>[202:2:252]&<br>[394:2:446]&<br>[449:2:499]<br>{400, 426, 220, 246} | RU 7<br>[14:2:66]&<br>[67:2:117]&<br>[261:2:313]&<br>[314:2:364]<br>{18, 44, 334, 360} | RU 8<br>[148:2:200]&<br>[201:2:251]&<br>[395:2:447]&<br>[448:2:498]<br>{152, 178, 468, 494} | |
| 242-tone RU | RU 1<br>[−500:2:− 380]&[−377:2:−259]&<br>[−253:2:− 133]&[−130:2:− 12]<br>{−112, −86, −44, −18, −494, −468, −426, −400} | | RU 2<br>[−499:2:− 379]&[−378:2:−260]&<br>[−252:2:− 132]&[−131:2:− 13]<br>{−360, −334, −292, −266, −246, −220, −178, −152} | | |

TABLE 3-continued

RU indexes and subcarrier ranges when MS-RU is performed on the pairwise combination on the 80 MHz sub-channel

| RU type | RU index, subcarrier range, and pilot subcarrier location | |
|---|---|---|
| | RU 3<br>[12:2:132]&[135:2:253]&<br>[259:2:379]&[382:2:500]<br>{18, 44, 86, 112, 152, 178,<br>220, 246} | RU 4<br>[13:2:133]&[134:2:252]&<br>[260:2:380]&[381:2:499]<br>{266, 292, 334, 360, 400, 426,<br>468, 494} |

A process of performing SS-RU on the sub-channel in this embodiment of this application is similar to the process of performing MS-RU on the sub-channel. A difference lies in that after the 26-tone RU is divided into the odd-numbered sub-RU and the even-numbered sub-RU based on the sub-carrier index, for example, the 26 sub-RU 1 and the 26 sub-RU 2, the sub-RUs are on spectra of two different RUs in the sub-channel.

Figure 8A:
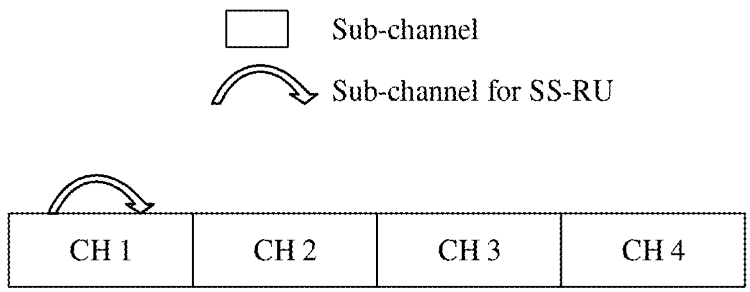
FIG. 8*a* is a schematic diagram of another RU distribution according to an embodiment of this application.
Figure 8B:
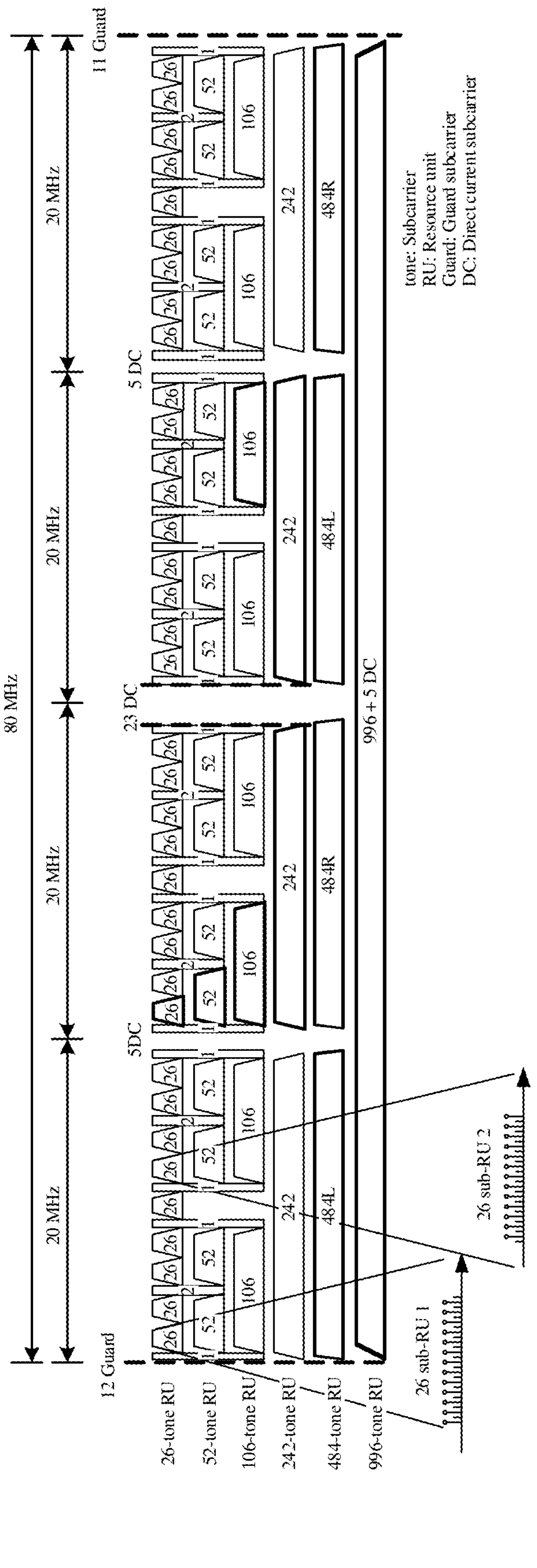
FIG. 8*b* is a schematic diagram of another RU distribution according to an embodiment of this application.

Specifically, FIG. 8*a* is a schematic diagram of another RU distribution according to this embodiment of this application. As shown in FIG. 8*a*, a CH 1 is a sub-channel on which an SS-RU is performed, and a first discrete resource unit may include a sub-RU in a RU 1 and a sub-RU in a RU 6 in the CH 1. Specifically, a process of performing SS-RU on the CH 1 on the first channel is described with reference to FIG. 8*b*. FIG. 8*b* is a schematic diagram of another RU distribution according to this embodiment of this application. As shown in FIG. 8*b*, a 26-tone RU is divided into an odd-numbered sub-RU and an even-numbered sub-RU based on a subcarrier index, for example, a 26 sub-RU 1 and a 26 sub-RU 2. Each sub-RU includes 13 subcarriers, and sub-RUs are on spectra of two different RUs in the 20 MHz sub-channel. For example, the 26 sub-RU 1 is on the RU 1 in the CH 1, and the 26 sub-RU 2 is on the RU 6 in the CH 1. There is a spacing of one subcarrier between every pair of adjacent subcarriers in each sub-RU.

On the basis of performing MS-RU on the sub-channel pairwise combination shown in Table 3, if the first sub-channel combination has one punctured sub-channel, and the second sub-channel combination has no punctured sub-channel, the plurality of discrete resource units include a first discrete resource unit and a second discrete resource unit. The first discrete resource unit includes sub-resource units corresponding to different RUs in an unpunctured sub-channel in the first sub-channel combination. For example, the first discrete resource unit includes a discrete resource unit obtained by performing SS-RU on the CH 1. The second discrete resource unit is a discrete resource unit corresponding to the second sub-channel combination. For example, the second discrete resource unit includes a discrete resource unit obtained by performing MS-RU on the CH 3 and the CH 4.

Figure 9A:
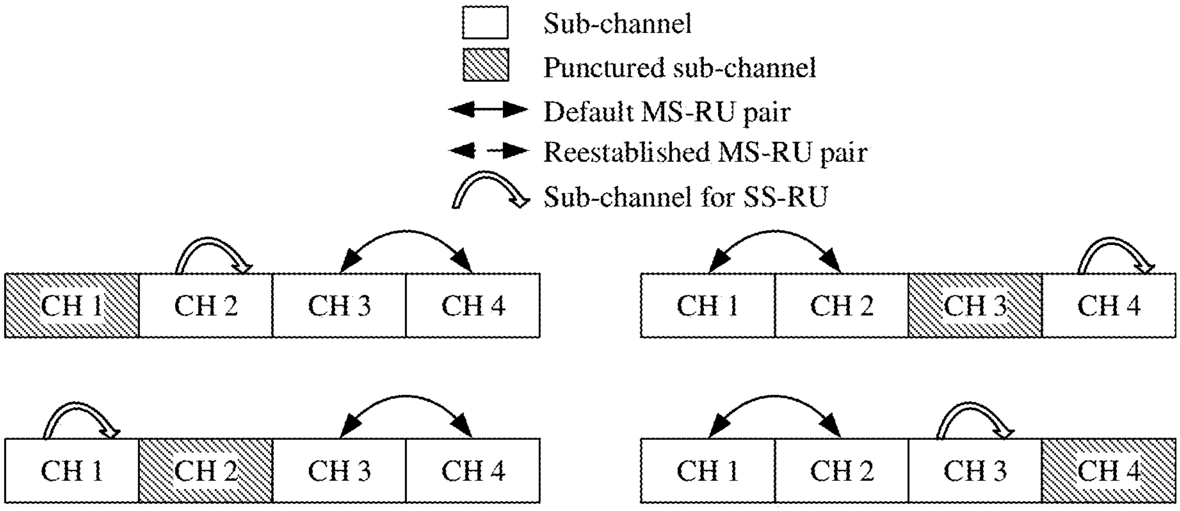
FIG. 9*a* is a schematic diagram of another RU distribution according to an embodiment of this application.

FIG. 9*a* is a schematic diagram of another RU distribution according to this embodiment of this application. As shown in FIG. 9*a*, if the CH 2 in the first sub-channel combination is punctured, and the CH 1, the CH 3, and the CH 4 in the first channel are not punctured, MS-RU cannot be performed on the CH 1 and the CH 2 in the original first sub-channel combination. The CH 1 in the first sub-channel combination is adjusted to perform SS-RU to obtain the first discrete resource unit, an MS-RU distribution combination of the CH 3 and the CH 4 in the second sub-channel combination remains unchanged, and MS-RU is performed on the CH 3 and the CH 4 to obtain the second discrete resource unit. When another single sub-channel on the first channel is punctured, an adjustment process of the discrete resource unit is similar to the adjustment process of the discrete resource unit when the CH 2 is punctured, and details are not described again.

The following uses the adjustment process of the discrete resource unit after the CH 2 is punctured as an example to describe, with reference to Table 4, a RU index and a subcarrier range when a single sub-channel on the first channel is punctured.

Figure 9B:
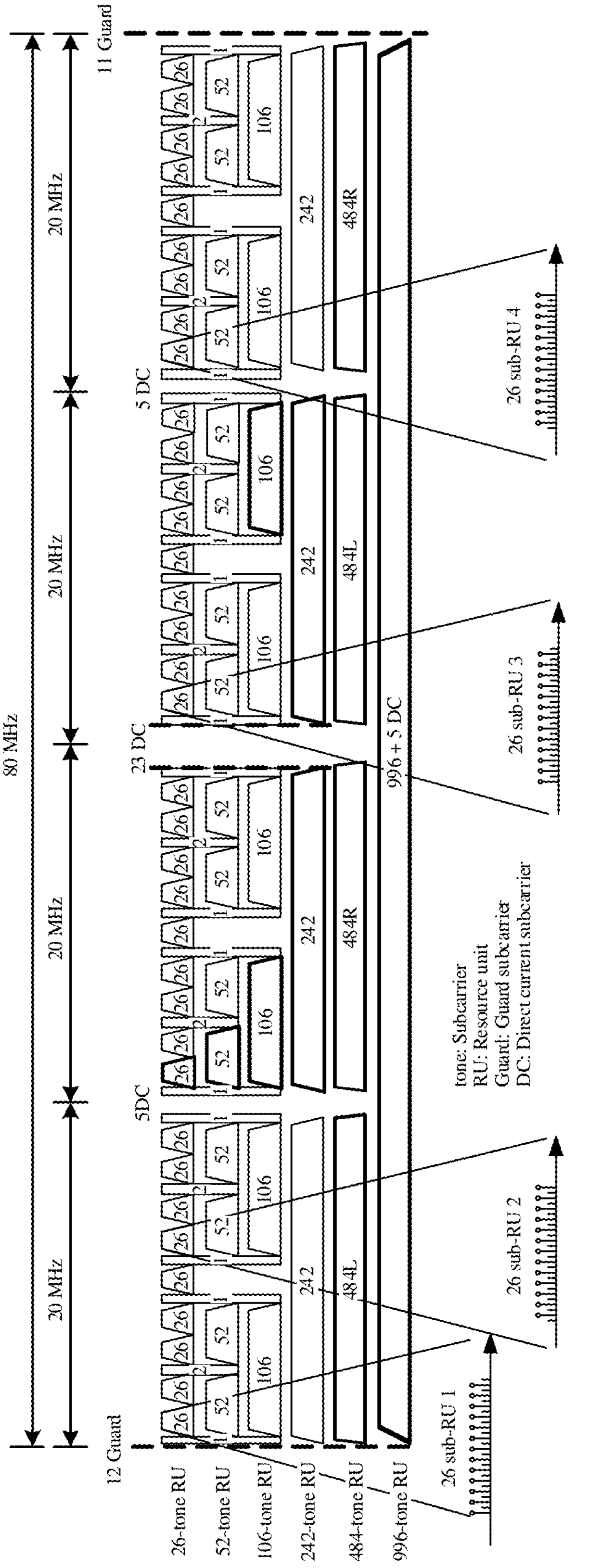
FIG. 9*b* is a schematic diagram of another RU distribution according to an embodiment of this application.

For example, when the CH 2 in the first sub-channel combination is punctured, the RU index and the subcarrier range of the first channel are adjusted from Table 3 to Table 4, and correspondingly, the RU distribution in the bandwidth is adjusted from FIG. 7*b* to FIG. 9*b*. FIG. 9*b* is a schematic diagram of another RU distribution according to this embodiment of this application. As shown in FIG. 9*b*, a bandwidth of the first channel is 80 MHz, and the first channel includes four 20 MHz sub-channels, for example, a CH 1, a CH 2, a CH 3, and a CH 4. When the CH 2 is punctured, the original MS-RU distribution combination of the CH 1 and the CH 2 cannot be implemented. The CH 1 is adjusted to perform SS-RU, and the first discrete resource unit is obtained after sub-RUs corresponding to the RU 1 and the RU 6 in the CH 1 are combined. Specifically, the RU 1 is divided into an odd-numbered sub-RU and an even-numbered sub-RU based on a subcarrier index, for example, a 26 sub-RU 1 and a 26 sub-RU 2. Each sub-RU includes 13 subcarriers, and sub-RUs are on spectra of different RUs in the CH 1. For example, the 26 sub-RU 1 is on the RU 1, and the 26 sub-RU 2 is on the RU 6. The second discrete resource unit is obtained based on the original MS-RU distribution combination of the CH 3 and the CH 4, and details are not described again.

It should be noted that in this embodiment of this application, if the CH 2 is punctured, the discrete RU distribution combination of the CH 3 and the CH 4 remains unchanged, and specific subcarrier indexes of this part are not provided in Table 4.

As shown in Table 4, the CH 1 performs discrete RU distribution in a single CH. For example, for a 26-tone RU, a RU 1 and a RU 6, and a RU 2 and a RU 7 respectively form an SS-RU pair, and a RU 5 keeps an original spectral range and is not discrete; for a 52-tone RU, a RU 1 and a RU 2, and a RU 3 and a RU 4 respectively form an SS-RU pair; for a 106-tone RU, a RU 1 and a RU 2 form an SS-RU pair; and the 242-tone RU is no longer discrete.

Each RU included in an unpunctured sub-channel is divided into two sub-RUs. A first sub-RU includes odd-numbered sub-carriers in a first half of the RU and even-numbered sub-carriers in a second half of the RU, and a second sub-RU includes even-numbered sub-carriers in the first half of the channel and odd-numbered sub-carriers in the second half of the channel.

In the RU 1 in a row corresponding to the 26-tone RU in Table 4, a subcarrier range of the 26-tone RU may be divided into the 26 sub-RU 1 and the 26 sub-RU 2 based on a subcarrier index. A subcarrier range of the 26 sub-RU 1 is [−499:2:−487]&[−484:2:−474], and a subcarrier −480 is a pilot subcarrier. A subcarrier range of the 26 sub-RU 2 is [−498:2:−486]&[−485:2:−473], and a subcarrier 494 is a pilot subcarrier.

In a RU 6 in the row corresponding to the 26-tone RU, a subcarrier range of the 26-tone RU may be divided into a 26 sub-RU 3 and a 26 sub-RU 4 based on a subcarrier index. A subcarrier range of the 26 sub-RU 3 is [−365:2:−353]&[−350:2:−340], and a subcarrier −346 is a pilot subcarrier. A subcarrier range of the 26 sub-RU 4 is [−364:2:−352]&[−351:2:−341], and a subcarrier −360 is a pilot subcarrier.

When the CH 2 is punctured, a RU 1 on the CH 1 and the RU 10 on the CH 2 in Table 3 cannot perform MS-RU, and the CH 1 is adjusted to perform SS-RU. The first discrete resource units DRU 1 and DRU 6 are obtained after sub-RUs corresponding to the RU 1 and the RU 6 are combined. A subcarrier range of the DRU 1 is [−499:2:−487]&[−484:2:−474]&[−365:2:−353]&[−350:2:−340], and a subcarrier −346 and a subcarrier −480 are pilot subcarriers. A subcarrier range of the DRU 6 is [−498:2:−486]&[−485:2:−473]&[−364:2:−352]&[−351:2:−341], and a subcarrier −494 and a subcarrier −360 are pilot subcarriers.

For a process of performing SS-RU on the sub-channels of the 52-tone RU and the 106-tone RU in Table 4, refer to that of the 26-tone RU, and details are not described again.

TABLE 4

RU indexes and subcarrier ranges when MS-RU is performed on a pairwise combination and a single sub-channel is punctured

| RU type | RU index, subcarrier range, and pilot subcarrier location | | | | |
|---|---|---|---|---|---|
| 26-tone | RU 1 | RU 2 | RU 3 | RU 4 | RU 5 |
| RU | [−499:2:−487]& | [−473:2:−461]& | [−445:2:−433]& | [−419:2:−407]& | [−392:−367] |
| | [−484:2:−474]& | [−458:2:−448]& | [−430:2:−420]& | [−404:2:−394]& | {−386, −372} |
| | [−365:2:−353]& | [−339:2:−327]& | [−311:2:−299]& | [−285:2:−273]& | (not discrete) |
| | [−350:2:−340] | [−324:2:−314] | [−296:2:−286] | [−270:2:−260] | |
| | {−346, −480} | {−320, −454} | {−292, −426} | {−266, −400} | |
| | RU 6 | RU 7 | RU 8 | RU 9 | |
| | [−498:2:−486]& | [−472:2:−460]& | [−444:2:−432]& | [−418:2:−406]& | |
| | [−485:2:−473]& | [−459:2:−449]& | [−431:2:−421]& | [−405:2:−395]& | |
| | [−364:2:−352]& | [−338:2:−326]& | [−310:2:−300]& | [−284:2:−272]& | |
| | [−351:2:−341] | [−325:2:−315] | [−297:2:−287] | [−271:2:−261] | |
| | {−360, −494} | {−468, −334} | {−440, −306} | {−414, −280} | |
| | — | — | — | — | — |
| | — | — | — | — | — |
| | RU 19–36 | | | | |
| 52-tone | RU 1 | RU 2 | RU 3 | RU 4 | |
| RU | [−499:2:−475]& | [−445:2:−421]& | [−498:2:−474]& | [−444:2:−420]& | |
| | [−472:2:−448]& | [−418:2:−394]& | [−473:2:−449]& | [−419:2:−395]& | |
| | [−365:2:−341]& | [−311:2:−287]& | [−364:2:−340]& | [−310:2:−286]& | |
| | [−338:2:−314] | [−284:2:−260] | [−339:2:−315] | [−285:2:−261] | |
| | {−334, −320, | {−280, −266, | {−494, −480, | {−440, −426, | |
| | −468, −454} | −414, −400} | −360, −346} | −306, −292} | |
| | — | — | — | — | — |
| | RU 9–RU 16 | | | | |
| 106-tone | RU 1 | RU 2 | — | — | |
| RU | [−499:2:−447]& | [−498:2:−446]& | | | |
| | [−444:2:−394]& | [−445:2:−395]& | | | |
| | [−365:2:−313]& | [−364:2:−312]& | | | |
| | [−310:2:−260] | [−311:2:−261] | | | |
| | {−426,−400, | {−494, −468, | | | |
| | −292, −266} | −360, −334} | | | |
| | RU 5–RU 8 | | | | |
| 242-tone | RU 1 | | — | | |
| RU | [−500:− 259] | | | | |
| | {−494, −468, −426, −400, −360, | | | | |
| | −334, −292, −266} | | | | |
| | (not discrete) | | | | |
| | RU 3, RU 4 | | | | |

Case 2: The first channel includes a first sub-channel combination and a second sub-channel combination; and if the first sub-channel combination and the second sub-channel combination each have one punctured sub-channel, the discrete resource unit includes a sub-resource unit corresponding to a RU in another unpunctured sub-channel in the first sub-channel combination and a sub-resource unit corresponding to a RU in another unpunctured sub-channel in the second sub-channel combination.

Figure 10A:
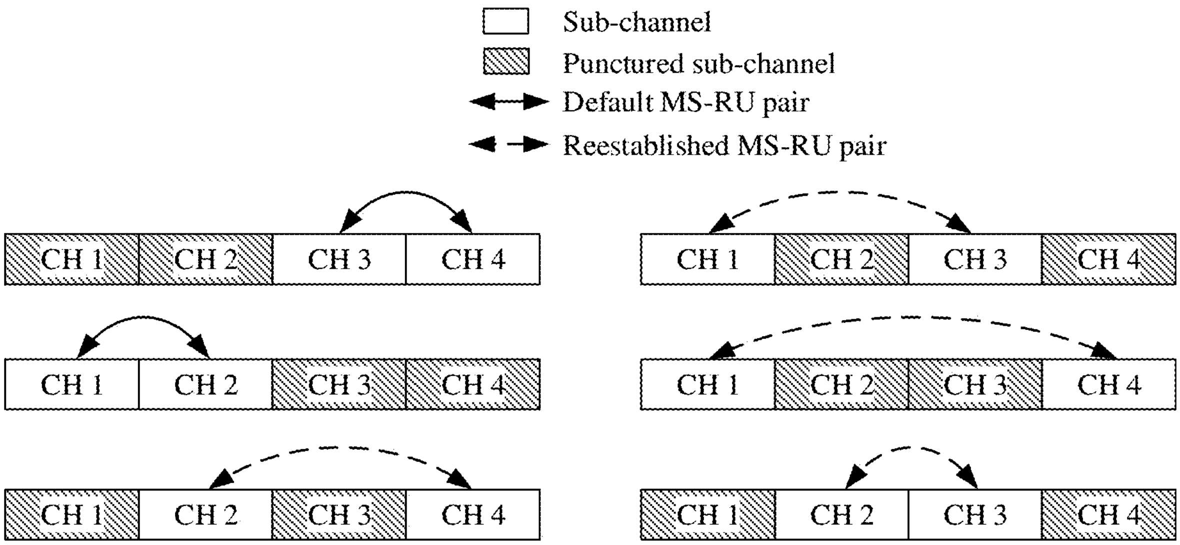
FIG. 10*a* is a schematic diagram of another RU distribution according to an embodiment of this application.

Specifically, when two sub-channels in the first channel are punctured, the remaining two sub-channels may be combined for discrete RU distribution. For example, FIG. 10*a* is a schematic diagram of another RU distribution according to this embodiment of this application. As shown in FIG. 10*a*, if two sub-channels on a first channel are punctured, for example, a CH 1 and a CH 2 are punctured, an MS-RU distribution combination of a CH 3 and a CH 4 remains unchanged. Likewise, if a CH 3 and a CH 4 are punctured, an MS-RU distribution combination of a CH 1 and a CH 2 remains unchanged. If a CH 2 and a CH 4 are punctured, a CH 1 and a CH 3 form a third sub-channel combination, and RUs in the CH 1 and the CH 3 re-establish an MS-RU pair to obtain a second discrete resource unit. Likewise, an adjustment process of a discrete resource unit when a CH 2 and a CH 3 are punctured, a CH 1 and a CH 3, or a CH 1 and a CH 4 are punctured is similar to the adjustment process of the discrete resource unit when the CH 2 and the CH 4 are punctured, and details are not described again.

For example, when the CH 2 in the first sub-channel combination and the CH 4 in the second sub-channel combination are punctured at the same time, distribution of RUs in the bandwidth is adjusted from FIG. 7*b* to FIG. 10*b*.

Figure 10B:
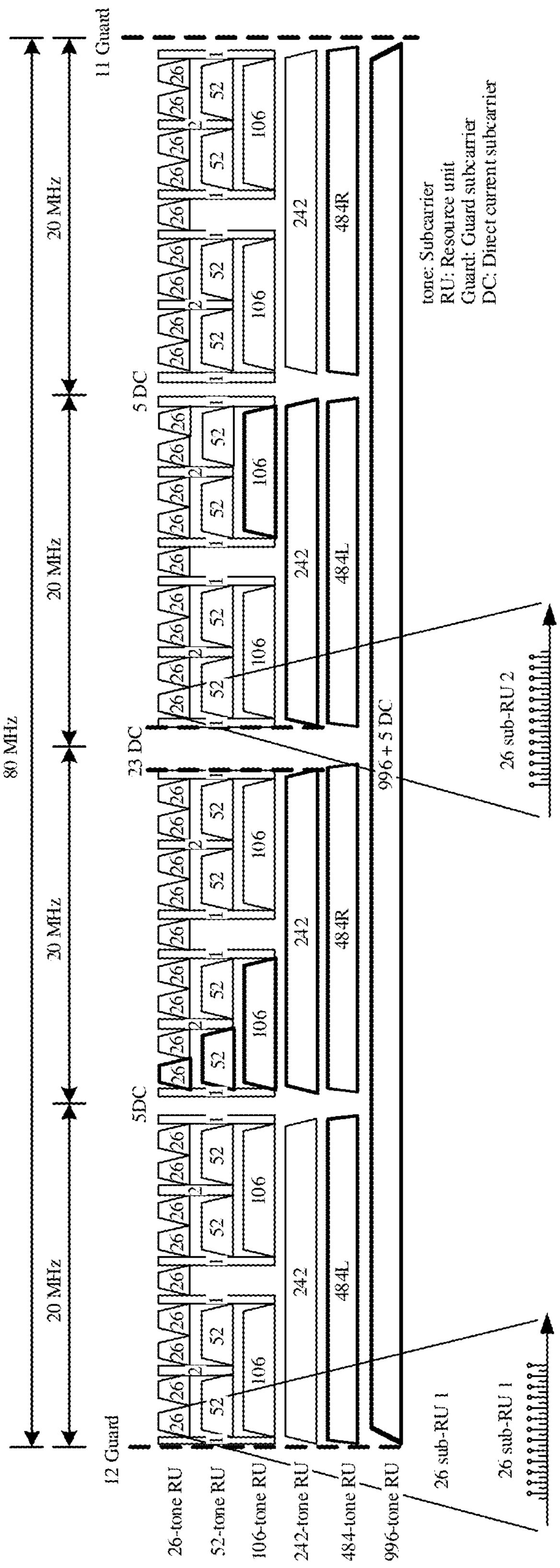
FIG. 10*b* is a schematic diagram of another RU distribution according to an embodiment of this application.

FIG. 10*b* is a schematic diagram of another RU distribution according to this embodiment of this application. As shown in FIG. 10*b*, the bandwidth of the first channel is 80 MHz, and the first channel includes four 20 MHz sub-channels, for example, a CH 1, a CH 2, a CH 3, and a CH 4. When the CH 2 and the CH 4 are punctured, an original MS-RU distribution combination of the CH 1 and the CH 2 cannot be implemented, and an original MS-RU distribution combination of the CH 3 and the CH 4 cannot be implemented. In this case, the CH 1 and the CH 3 may be adjusted to form a third sub-channel combination, and RUs in the CH 1 and the CH 3 re-establish an MS-RU pair to obtain the second discrete resource unit. Specifically, the RU 1 in the CH 1 is divided into an odd-numbered sub-RU and an even-numbered sub-RU based on a sub-carrier index, for example, a 26 sub-RU 1 and a 26 sub-RU 2. Each sub-RU includes 13 sub-carriers, and each sub-RU is on a different sub-channel. For example, the 26 sub-RU 1 is on the CH 1, and the 26 sub-RU 2 is on the CH 3.

In this embodiment of this application, for a process of recombining, after any two sub-channels in the first channel are punctured, remaining unpunctured sub-channels in the first sub-channel combination and the first sub-channel combination to perform MS-RU, refer to the process of performing MS-RU on any one of the foregoing sub-channels. For RU indexes and subcarrier range distribution when the two sub-channels are punctured, refer to Table 4. Details are not described again.

Case 3: The first channel includes a first sub-channel combination, the first sub-channel combination includes all sub-channels in the first channel, and if the first sub-channel combination has at least one punctured sub-channel, the plurality of discrete resource units includes a first discrete resource unit and/or a second discrete resource unit, the first discrete resource unit includes sub-resource units corresponding to different RUs in one sub-channel of unpunctured sub-channels, and the second discrete resource unit includes sub-resource units corresponding to RUs in a plurality of sub-channels of unpunctured sub-channels.

The first discrete resource unit may include a discrete resource unit obtained after SS-RU is performed on an unpunctured sub-channel, and the second discrete resource unit may include a discrete resource unit obtained after MS-RU is performed on an unpunctured sub-channel. With reference to the accompanying drawings, the following describes MS-RU or SS-RU resource distribution on sub-channels in a puncture case.

For example, in this embodiment of this application, the bandwidth of the first channel is 80 MHz. The first channel includes four sub-channels with a bandwidth of 20 MHz. For ease of description, the four sub-channels are denoted as a CH 1, a CH 2, a CH 3, and a CH 4 in ascending order of frequencies.

Specifically, an example in which each sub-channel combination includes four sub-channels is used to describe the MS-RU or the SS-RU resource distribution on the sub-channels. For example, a first sub-channel combination includes the CH 1, the CH 2, the CH 3, and the CH 4.

Figure 11A:
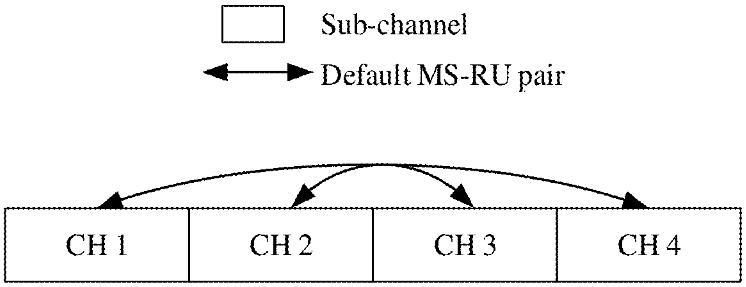
FIG. 11*a* is a schematic diagram of another RU distribution according to an embodiment of this application.

FIG. 11*a* is a schematic diagram of another RU distribution according to this embodiment of this application. As shown in FIG. 11*a*, the CH 1, the CH 2, the CH 3, and the CH 4 form a first MS-RU pair. The following describes specific distribution of the channel combination in FIG. 11*a* on the first channel with reference to FIG. 11*b*.

Figure 11B:
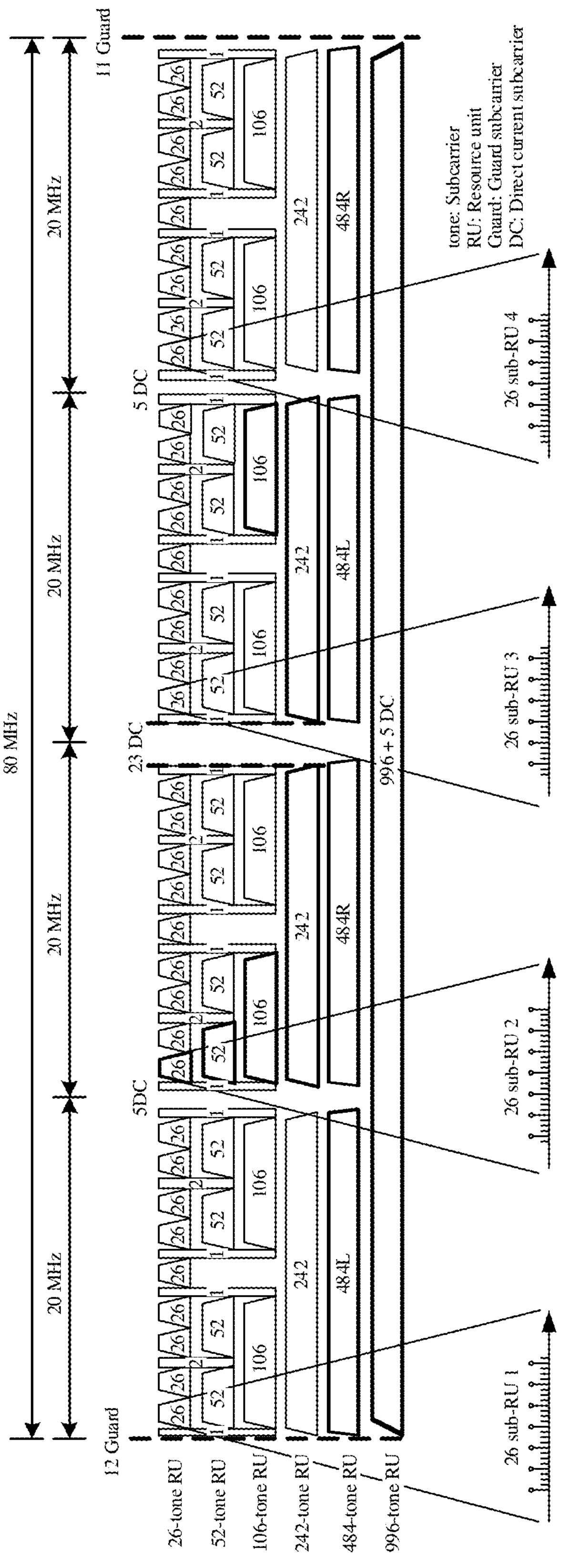
FIG. 11*b* is a schematic diagram of another RU distribution according to an embodiment of this application.

FIG. 11*b* is a schematic diagram of another RU distribution according to this embodiment of this application. As shown in FIG. 11*b*, the bandwidth of the first channel is 80 MHz, and the first channel includes four 20 MHz sub-channels, for example, the CH 1, the CH 2, the CH 3, and the CH 4. RUs of the four sub-channels are combined to perform MS-RU. A 26-tone RU is divided into four sub-RUs based on a subcarrier index, for example, a 26 sub-RU 1, a 26 sub-RU 2, a 26 sub-RU 3, and a 26 sub-RU 4. Each sub-RU is on a different sub-channel. For example, the 26 sub-RU 1 is on the CH 1, the 26 sub-RU 2 is on the CH 2, the 26 sub-RU 3 is on the CH 3, and the 26 sub-RU 4 is on the CH 4. There is a spacing of three subcarriers between every pair of adjacent subcarriers in each sub-RU in a discrete resource unit. According to the resource allocation shown in FIG. 11*b*, 26-tone RUs whose original frequency span is 2 MHz may be distributed to a frequency range of 8 MHz. The following describes the RU allocation in FIG. 7*b* with reference to Table 5.

Table 5 shows RU indexes and subcarrier ranges when MS-RU is performed on four sub-channels on an 80 MHz sub-channel. As shown in Table 5, a CH 1, a CH 2, a CH 3, and a CH 4 form a first sub-channel combination. For example, for a 26-tone RU, {RU 1, RU 10, RU 19, RU 28}, {RU 2, RU 11, RU 20, RU 29}, and the like separately form an MS-RU pair. For a 52-tone RU, {RU 1, RU 5, RU 9, RU 13}, {RU 2, RU 6, RU 10, RU 14}, and the like respectively form an MS-RU pair. For a 106-tone RU, {RU 1, RU 3, RU 5, RU 7} and {RU 2, RU 4, RU 6, RU 8} respectively form an MS-RU pair. For a 242-tone RU, {RU 1, RU 2, RU 3, RU 4} form an MS-RU pair.

The 26-tone RU is divided into four sub-RUs at a spacing of four subcarriers, for example, a 26 sub-RU 1, a 26 sub-RU 2, a 26 sub-RU 3, and a 26 sub-RU 4. A location of the 26 sub-RU 1 remains unchanged, the 26 sub-RU 2 is on the CH 2, the 26 sub-RU 3 is on the CH 3, and the 26 sub-RU 4 is on the CH 4. This s ensures that the original contiguous RUs are distributed on four sub-channels, and each discrete RU has two pilot subcarriers. The 52-tone RU is divided into four groups of sub-RUs: a RU 1 to a RU 13, a RU 14 to a RU 26, a RU 27 to a RU 39, a RU 40 to a RU 52, and is distributed to four sub-channels in the same manner as the 26-tone RU, so that each sub-RU has one pilot subcarrier. The 106-tone RU and the 242-tone RU are also distributed in a similar manner.

For example, the 26-tone RU on the CH 1 is a RU 1 in a row corresponding to the 26-tone RU in Table 5, and a subcarrier range of the 26-tone RU may be divided into the 26 sub-RU 1, the 26 sub-RU 2, 26 sub-RU 3, and the 26 sub-RU 4 based on a subcarrier index. A subcarrier range of the 26 sub-RU 1 is [−499:4:−475], a subcarrier range of the 26 sub-RU 2 is [−497:4:−477], a subcarrier range of the 26 sub-RU 3 is [−498:4:−474], and a subcarrier range of the 26 sub-RU 4 is [394:4:418].

For a process of performing MS-RU on the four sub-channels, refer to the foregoing process of performing MS-RU on the two sub-channels, and details are not described again.

TABLE 5

RU indexes and subcarrier ranges when MS-RU is performed on the four sub-channels on the 80 MHz sub-channel

| RU type | RU index, subcarrier range, and pilot subcarrier location | | | | |
|---|---|---|---|---|---|
| 26-tone RU | RU 1<br>[−499:4:−475]&<br>[14:4:38]&<br>[−250:4:−230]&<br>[263:4:283]<br>{18, −246} | RU 2<br>[−473:4:−449]&<br>[40:4:64]&<br>[−224:4:−204]&<br>[289:4:309]<br>{44, −220} | RU 3<br>[−445:4:−421]&<br>[68:4:92]&<br>[−196:4:−176]&<br>[317:4:337]<br>{72, −192} | RU 4<br>[−419:4:−395]&<br>[94:4:118]&<br>[−170:4:−150]&<br>[343:4:363]<br>{98, −166} | RU 5<br>[−392:4:−368]&<br>[121:4:145]&<br>[−143:4:−123]&<br>[364:4:390]<br>{386, −372} |
| | RU 6<br>[−365:4:−341]&<br>[148:4:172]&<br>[−116:4:−96]&<br>[397:4:417]<br>{152, −112} | RU 7<br>[−339:4:−315]&<br>[174:4:198]&<br>[−90:4:−70]&<br>[423:4:443]<br>{178, −86} | RU 8<br>[−311:4:−287]&<br>[202:4:226]&<br>[−62:4:−42]&<br>[451:4:471]<br>{206, −58} | RU 9<br>[−285:4:−261]&<br>[228:4:252]&<br>[−36:4:−13]&<br>[477:4:497]<br>{232, −32} | |
| | RU 10<br>[−252:4:−228]&<br>[261:4:285]&<br>[−497:4:−477]&<br>[16:4:36]<br>{−232, 32} | RU 11<br>[−226:4:−202]&<br>[287:4:311]&<br>[−471:4:−451]&<br>[42:4:62]<br>{−206, 58} | RU 12<br>[−198:4:−174]&<br>[315:4:339]&<br>[−443:4:−423]&<br>[70:4:90]<br>{−178, 86} | RU 13<br>[−172:4:−148]&<br>[341:4:365]&<br>[−417:4:−397]&<br>[96:4:116]<br>{−152, 112} | RU 14<br>[−145:4:−121]&<br>[366:4:392]&<br>[−390:4:−370]&<br>[123:4:143]<br>{372, −386} |
| | RU 15<br>[−118:4:−94]&<br>[395:4:419]&<br>[−363:4:−343]&<br>[150:4:170]<br>{−98, 166} | RU 16<br>[−92:4:−68]&<br>[421:4:445]&<br>[−337:4:−317]&<br>[176:4:196]<br>{−72, 192} | RU 17<br>[−64:4:−40]&<br>[449:4:473]&<br>[−309:4:−289]&<br>[204:4:224]<br>{−44, 220} | RU 18<br>[−38:4:−14]&<br>[475:4:499]&<br>[−283:4:−263]&<br>[230:4:250]<br>{−18, 246} | |
| | RU 19<br>[13:4:37]&<br>[−498:4:−474]&<br>[262:4:282]&<br>[−249:4:−229]<br>{−494, 266} | RU 20<br>[39:4:63]&<br>[−472:4:−448]&<br>[288:4:308]&<br>[−223:4:−203]<br>{−468, 292} | RU 21<br>[67:4:91]&<br>[−197:4:−173]&<br>[316:4:336]&<br>[−195:4:−175]<br>{−440, 320} | RU 22<br>[93:4:117]&<br>[−418:4:−394]&<br>[342:4:362]&<br>[−169:4:−149]<br>{−414, 346} | RU 23<br>[120:4:144]&<br>[−391:4:−367]&<br>[365:4:389]&<br>[−142:4:−122]<br>{140, −126} |
| | RU 24<br>[147:4:171]&<br>[−364:4:−340]&<br>[396:4:416]&<br>[−115:4:−95]<br>{−360, 400} | RU 25<br>[173:4:197]&<br>[−338:4:−314]&<br>[422:4:442]&<br>[−89:4:−69]<br>{−334, 426} | RU 26<br>[201:4:225]&<br>[−63:4:−39]&<br>[450:4:470]&<br>[−61:4:−41]<br>{−306, 454} | RU 27<br>[227:4:251]&<br>[−284:4:−260]&<br>[476:4:496]&<br>[−35:4:−15]<br>{−280, 480} | |
| | RU 28<br>[260:4:284]&<br>[−251:4:−227]&<br>[15:4:35]&<br>[−496:4:−476]<br>{280, −480} | RU 29<br>[286:4:310]&<br>[−225:4:−201]&<br>[41:4:61]&<br>[−470:4:−450]<br>{306, −454} | RU 30<br>[314:4:338]&<br>[−197:4:−173]&<br>[69:4:89]&<br>[−442:4:−422]<br>{334, −426} | RU 31<br>[340:4:364]&<br>[−171:4:−147]&<br>[95:4:115]&<br>[−416:4:−396]<br>{360, −400} | RU 32<br>[367:4:391]&<br>[−144:4:−120]&<br>[122:4:142] &<br>[−389:4:−371]<br>{−140, 126} |
| | RU 33<br>[394:4:418]&<br>[−117:4:−93]&<br>[149:4:169]&<br>[−362:4:−342]<br>{414, −346} | RU 34<br>[420:4:444]&<br>[−91:4:−67]&<br>[175:4:195]&<br>[−336:4:−316]<br>{440, −320} | RU 35<br>[448:4:472]&<br>[−63:4:−39]&<br>[203:4:223]&<br>[−308:4:−288]<br>{468, −292} | RU 36<br>[474:4:498]&<br>[−37:4:−16]&<br>[229:4:249]&<br>[−282:4:−262]<br>{494, −266} | |
| 52-tone RU | RU 1<br>[−499:−487]&<br>[26:38]&<br>[−226:−214]&<br>[299:311]<br>{−494, 32,<br>−220, 306} | RU 2<br>[−445:−433]&<br>[80:92]&<br>[−172:−160]&<br>[353:365]<br>{−440, 86,<br>−166, 360} | RU 3<br>[−365:−353]&<br>[160:172]&<br>[−92:−80]&<br>[433:445]<br>{−360, 166,<br>−86, 440} | RU 4<br>[−311:−299]&<br>[214:226]&<br>[−48:−36]&<br>[487:499]<br>{−306, 220,<br>−32, 494} | |
| | RU 5<br>[−252:−240]&<br>[273:285]&<br>[−473:−461]& | RU 6<br>[−198:−186]&<br>[327:339]&<br>[−429:−417]& | RU 7<br>[−118:−106]&<br>[407:419]&<br>[−339:−327]& | RU 8<br>[−64:−52]&<br>[461:473]&<br>[−285:−273]& | |

TABLE 5-continued

| RU indexes and subcarrier ranges when MS-RU is performed on the four sub-channels on the 80 MHz sub-channel | | | | |
|---|---|---|---|---|
| RU type | RU index, subcarrier range, and pilot subcarrier location | | | |
| | [52:64]<br>{−246, 280,<br>−468, 58} | [106:118]<br>{−192, 334,<br>−414, 112} | [186:198]<br>{−112, 414,<br>−334, 192} | [240:252]<br>{−58, 468,<br>−280, 246} |
| | RU 9<br>[13:25]&<br>[−486:−474]&<br>[286:298]&<br>[−213:−201]<br>{18, −480,<br>292, −206} | RU 10<br>[67:79]&<br>[−432:−430]&<br>[340:352]&<br>[−159:−147]<br>{72, −426,<br>346, −152} | RU 11<br>[147:159]&<br>[−352:−340]&<br>[420:432]&<br>[−79:−67]<br>{152, −346,<br>426, −72} | RU 12<br>[201:213]&<br>[−298:−286]&<br>[474:486]&<br>[−35:−13]<br>{206, −292,<br>480, −18} |
| | RU 13<br>[260:272]&<br>[−239:−227]&<br>[39:51]&<br>[−460:−448]<br>{266, −232,<br>44, −454} | RU 14<br>[314:326]&<br>[−185:−173]&<br>[93:105]&<br>[−416:−394]<br>{320, −178,<br>98, −400} | RU 15<br>[394:406]&<br>[−105:−93]&<br>[173:185]&<br>[−326:−314]<br>{400, −98,<br>178, −320} | RU 16<br>[448:460]&<br>[−51:−49]&<br>[227:239]&<br>[−272:−260]<br>{454, −44,<br>232, −266} |
| 106-tone RU | RU 1<br>[−499:−473]&<br>[40:66]&<br>[−198:−173]&<br>[340:365]<br>{−494, 44,<br>−178, 360} | RU 2<br>[−365:−339]&<br>[174:200]&<br>[−64:−39]&<br>[474:499]<br>{−360, 178,<br>−44, 494} | RU 3<br>[−252:−226]&<br>[287:313]&<br>[−445:420]&<br>[93:118]<br>{−246, 292,<br>−426, 112} | RU 4<br>[−118:−92]&<br>[421:447]&<br>[−311:−286]&<br>[227:252]<br>{−112, 426,<br>−292, 246} |
| | RU 5<br>[13:39]&<br>[−472:−446]&<br>[314:339]&<br>[−172:−147]<br>{18, −468,<br>334, −152} | RU 6<br>[147:173]&<br>[−338:−312]&<br>[448:473]&<br>[−38:−13]<br>{152, −334,<br>468, −18} | RU 7<br>[260:286]&<br>[−225:−199]&<br>[67:92]&<br>[−419:−394]<br>{266, −220,<br>86, −400} | RU 8<br>[394:420]&<br>[−91:−65]&<br>[201:226]&<br>[−285:−260]<br>{400, −86,<br>220, −266} |
| 242-tone RU | RU 1<br>[−500:−440]&[73:133]&<br>[−131:−72]&[441:500]<br>{−494, −468, 86, 112, −112,<br>−86, 468, 494} | | RU 2<br>[−253:−193]&[320:380]&<br>[−378:−319]&[194:253]<br>{−246, −220, 334, 360, −360,<br>−334, 220, 246} | |
| | RU 3<br>[12:72]&[−439:−379]&<br>[381:440]&[−71:−12]<br>{18, 44, −426, −400, 400, 426,<br>−44, −18} | | RU 4<br>[259:319]&[−192:−132]&<br>[134:193]&[−318:−259]<br>{266, 292, −178, −152, 152,<br>178, −292, −266} | |

Based on the MS-RU performed on the combination of the four sub-channels shown in Table 5, if a single sub-channel in the first channel is punctured, any two of the remaining three sub-channels may be combined to perform MS-RU distribution, and another sub-channel perform SS-RU distribution. If two sub-channels in the first channel are punctured, the remaining two sub-channels may be combined for MS-RU distribution.

Figure 12:
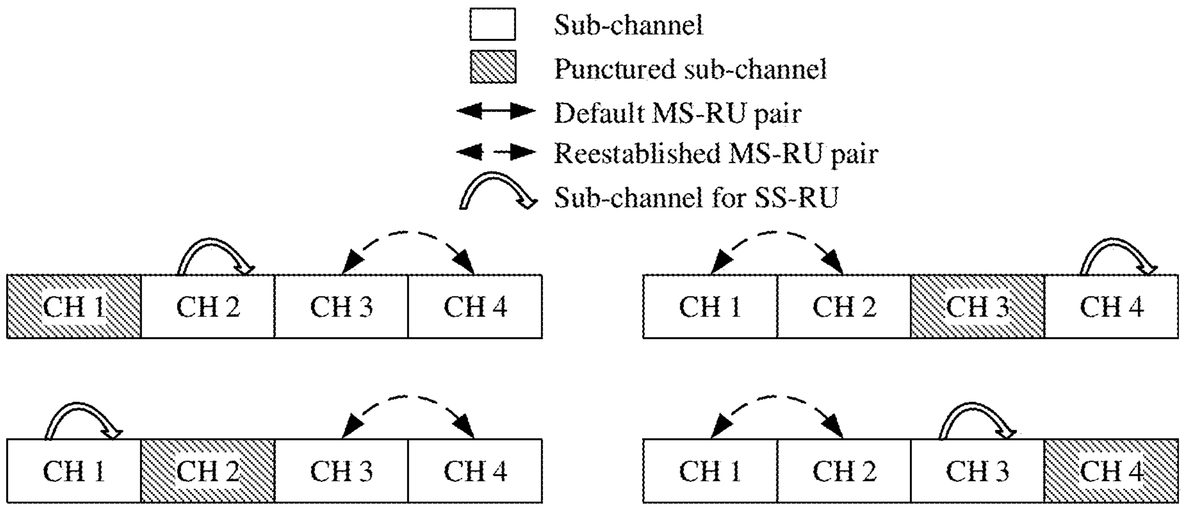
FIG. 12 is a schematic diagram of another RU distribution according to an embodiment of this application.

FIG. 12 is a schematic diagram of another RU distribution according to this embodiment of this application. If the CH 2 in the first sub-channel combination is punctured, the CH 1, and the CH 3, and the CH 4 in the first channel are not punctured, the CH 1, the CH 2, the CH 3, and the CH 4 in the first sub-channel combination cannot be combined to perform MS-RU, and the CH 2 in the first sub-channel combination is adjusted to perform SS-RU to obtain the first discrete resource unit. The CH 3 and the CH 4 are combined to perform MS-RU to obtain the second discrete resource unit. When another single sub-channel in the first channel is punctured, an adjustment process of a discrete resource unit is similar to the adjustment process of the discrete resource unit when the CH 2 is punctured, and details are not described again.

For example, for RU distribution on an adjusted bandwidth when the CH 2 is punctured, refer to FIG. 9*b*. FIG. 9*b* may be adjusted based on FIG. 11*b* according to the foregoing method. Adjusted RU indexes and subcarrier ranges are shown in Table 6. Table 6 may be obtained by adjusting Table 5 according to the foregoing method.

TABLE 6

| RU indexes and subcarrier ranges when MS-RU is performed on a combination of four sub-channels and a single sub-channel is punctured | | | | | |
|---|---|---|---|---|---|
| RU type | RU index, subcarrier range, and pilot subcarrier location | | | | |
| 26-tone RU | RU 1<br>[−499:2:−487]&<br>[−484:2:−474]&<br>[−365:2:−353]&<br>[−350:2:−340] | RU 2<br>[−473:2:−461]&<br>[−458:2:−448]&<br>[−339:2:−327]&<br>[−324:2:−314] | RU 3<br>[−445:2:−433]&<br>[−430:2:−420]&<br>[−311:2:−299]&<br>[−296:2:−286] | RU 4<br>[−419:2:−407]&<br>[−404:2:−394]&<br>[−285:2:−273]&<br>[−270:2:−260] | RU 5<br>[−392: −367]<br>{−386, −372}<br>(not discrete) |

TABLE 6-continued

RU indexes and subcarrier ranges when MS-RU is performed on a combination of four sub-channels and a single sub-channel is punctured

| RU type | RU index, subcarrier range, and pilot subcarrier location | | | | |
|---|---|---|---|---|---|
| | {−346, −480} | {−320, −454} | {−292, −426} | {−266, −400} | |
| | RU 6 | RU 7 | RU 8 | RU 9 | |
| | [−498:2:−486]& | [−472:2:−460]& | [−444:2:−432]& | [−418:2:−406]& | |
| | [−485:2:−473]& | [−459:2:−449]& | [−431:2:−421]& | [−405:2:−395]& | |
| | [−364:2:−352]& | [−338:2:−326]& | [−310:2:−300]& | [−284:2:−272]& | |
| | [−351:2:−341] | [−325:2:−315] | [−297:2:−287] | [−271:2:−261] | |
| | {−360, −494} | {−468, −334} | {−440, −306} | {−414, −280} | |
| | — | — | — | — | — |
| | — | — | — | — | — |
| | RU 19–36 | | | | |
| 52-tone | RU 1 | RU 2 | RU 3 | RU 4 | |
| RU | [−499:2:−475]& | [−445:2:−421]& | [−498:2:−474]& | [−444:2:−420]& | |
| | [−472:2:−448]& | [−418:2:−394]& | [−473:2:−449]& | [−419:2:−395]& | |
| | [−365:2:−341]& | [−311:2:−287]& | [−364:2:−340]& | [−310:2:−286]& | |
| | [−338:2:−314] | [−284:2:−260] | [−339:2:−315] | [−285:2:−261] | |
| | {−334, −320, | {−280, −266, | {−494, −480, | {−440, −426, | |
| | −468, −454} | −414, −400} | −360, −346} | −306, −292} | |
| | — | — | — | — | — |
| | RU 9-RU 16 | | | | |
| 106-tone | RU 1 | RU 2 | — | — | |
| RU | [−499:2:−447]& | [−498:2:−446]& | | | |
| | [−444:2:−394]& | [−445:2:−395]& | | | |
| | [−365:2:−313]& | [−364:2:−312]& | | | |
| | [−310:2:−260] | [−311:2:−261] | | | |
| | {, −426, −400, | {−494, −468, | | | |
| | −292, −266} | −360, −334} | | | |
| | RU 5-RU 8 | | | | |
| 242-tone | RU 1 | | — | | |
| RU | [−500:−259] | | | | |
| | {−494, −468, −426, −400, | | | | |
| | −360, −334, −292, −266} | | | | |
| | (not discrete) | | | | |
| | RU 3, RU 4 | | | | |

Figure 13:
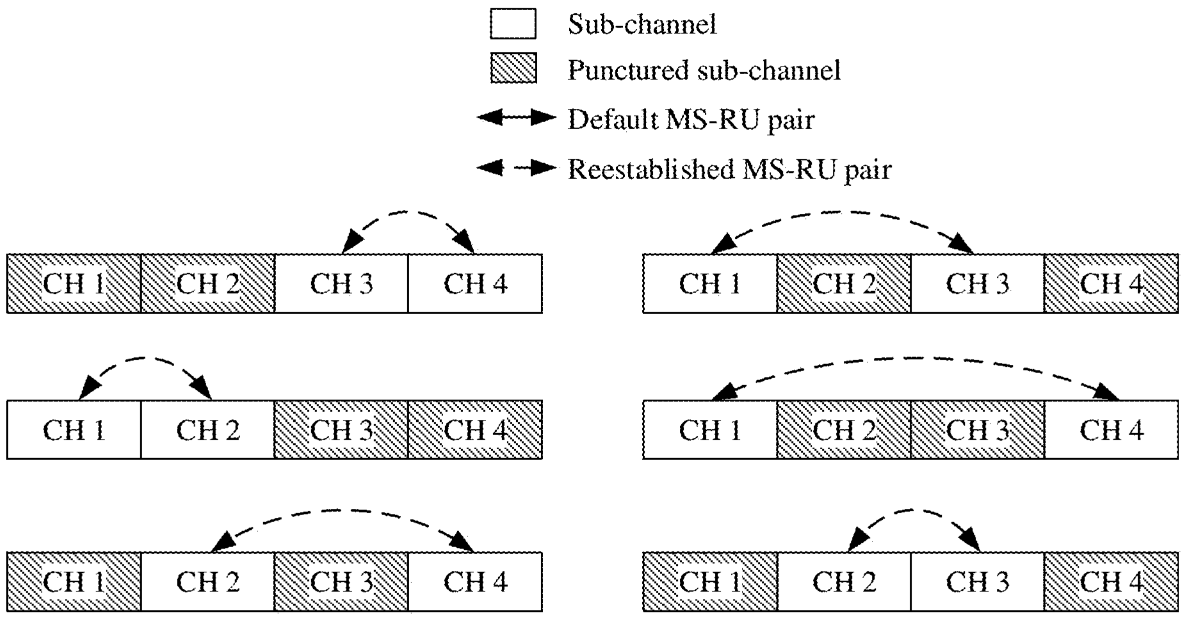
FIG. 13 is a schematic diagram of another RU distribution according to an embodiment of this application.

FIG. 13 is a schematic diagram of another RU distribution according to this embodiment of this application. If the CH 1 and the CH 2 in the first sub-channel combination are punctured, and the CH 3 and the CH 4 in the first channel are not punctured, MS-RU cannot be performed on the CH 1, the CH 2, the CH 3, and the CH 4 in the first sub-channel combination, and the CH 3 and the CH 4 in the first sub-channel combination are adjusted to perform MS-RU to obtain the second discrete resource unit. When any two other sub-channels in the first channel are punctured, an adjustment process of a discrete resource unit is similar to the adjustment process of the discrete resource unit when the CH 1 and the CH 2 are punctured, and details are not described again.

For example, for RU distribution on an adjusted bandwidth when the CH 2 and the CH 4 are punctured, refer to FIG. 10*b*. FIG. 10*b* may be obtained by adjusting FIG. 11*b* according to the foregoing method. Case 1, Case 2, and Case 3 correspond to a RU distribution adjustment method when the second preset bandwidth is 80 MHz and a sub-channel is punctured in the channel. Likewise, when the second preset bandwidth is greater than 80 MHz, a frequency resource may be divided based on the 80 MHz bandwidth. Resource allocation may be performed, by using the method for distributing RUs on the 80 MHz channel, on a channel obtained after division. For an adjustment process of distribution of the RUs when the channel obtained through division has a punctured channel, refer to the adjustment process of the distribution of any type of RU on the 80 MHz channel.

For example, it is assumed that an available frequency resource is 320 MHz, the transmit end divides the 320 MHz bandwidth into four channels of 80 MHz, and the channels obtained after division are arranged in ascending order of frequencies as a first channel, a second channel, a third channel, and a fourth channel.

The first channel and the second channel may be combined for MS-RU, and the third channel and the fourth channel may be combined for MS-RU. When the first channel is punctured, and the second channel, the third channel and the fourth channel are not punctured, the second channel may be adjusted to perform the SS-RU to obtain a first discrete resource unit, an MS-RU distribution combination of the third channel and the fourth channel remains unchanged, and MS-RU is performed on the third channel and the fourth channel to obtain a second discrete resource unit. When the first channel and the third channel are punctured, and the second channel and the fourth channel are not punctured, a combination of the second channel and the fourth channel is adjusted to perform MS-RU, to obtain a second discrete resource unit. An adjustment process after another channel is punctured in a similar scenario is similar to the foregoing process, and details are not described again.

MS-RU may be performed on the first channel in combination with the second channel, the third channel, and the fourth channel. When the first channel is punctured, and the second channel, the third channel, and the fourth channel are not punctured, the second channel may be adjusted to perform SS-RU obtain a first discrete resource unit, and the third channel and the fourth channel may be adjusted to perform MS-RU to obtain a second discrete resource unit. When the first channel and the third channel are punctured, and the second channel and the fourth channel are not punctured, a combination of the second channel and the fourth channel is adjusted to perform MS-RU, to obtain a second discrete resource unit. An adjustment process after another channel is punctured in a similar scenario is similar to the foregoing process, and details are not described again.

The foregoing mainly describes the solutions provided in embodiments of this application from a perspective of interaction between nodes. It may be understood that, to implement the foregoing functions, each node such as an AP or a STA includes a corresponding hardware structure and/or a corresponding software module for performing each function. Persons skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of embodiments of this application.

In embodiments of this application, the AP and the STA may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example, and is merely logical function division. In actual implementation, another division manner may be used.

Figure 14A:
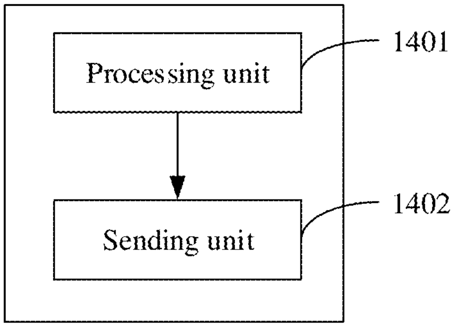
FIG. 14*a* is a schematic diagram of a communication apparatus according to an embodiment of this application.

FIG. 14*a* is a structural diagram of a communication apparatus. The communication apparatus may be an AP, and the communication apparatus may be configured to perform a function of the AP in the foregoing embodiment. In a possible implementation, the communication apparatus shown in FIG. 14*a* includes a processing unit 1401 and a sending unit 1402.

The processing unit 1401 is configured to generate a PPDU, where the PPDU has one or more discrete resource units, the discrete resource unit includes a plurality of sub-resource units, the plurality of sub-resource units include a plurality of discontiguous sub-resource units in an unpunctured sub-channel in a first channel, and/or the plurality of sub-resource units include sub-resource units in a plurality of unpunctured sub-channels in the first channel; the sub-channel includes a plurality of resource units RUs, and the sub-resource unit includes some or all subcarriers in one RU; and the first channel includes a plurality of sub-channels. For example, the processing unit 1401 may support the communication apparatus shown in FIG. 14*a* in performing step 401.

The sending unit 1402 is configured to send the PPDU. For example, the sending unit 1402 may support the communication apparatus shown in FIG. 14*a* in performing step 402.

Figure 14B:
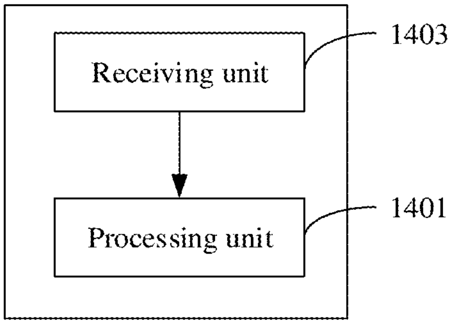
FIG. 14*b* is a schematic diagram of another communication apparatus according to an embodiment of this application.

FIG. 14*b* is a structural diagram of another communication apparatus. The communication apparatus may be a STA, and the communication apparatus may be configured to perform a function of the STA in the foregoing embodiment. In a possible implementation, the communication apparatus shown in FIG. 14*b* includes a processing unit 1401 and a receiving unit 1403.

The processing unit 1401 is configured to perform data processing on a PPDU to determine a resource unit allocation status. For example, the processing unit 1401 may support the communication apparatus shown in FIG. 14*b* in performing step 403.

The receiving unit 1403 is configured to receive the PPDU.

The processing unit may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Specifically, all related content of the steps in the foregoing method embodiments shown in FIG. 4 to FIG. 13 may be cited in function descriptions of the corresponding functional units, and details are not described herein again. The communication apparatus is configured to perform a function in the communication method shown in the methods shown in FIG. 4 to FIG. 13, and therefore can achieve the same effect as the foregoing communication method.

Embodiments of this application further provide a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal, for example, including a data transmit end and/or a data receive end, in any one of the foregoing embodiments, for example, a hard disk drive or a memory of the terminal. Alternatively, the computer-readable storage medium may be an external storage device of the terminal, for example, a plug-in hard disk, a smart media card (smart media card, SMC), a secure digital (secure digital, SD) card, a flash card (flash card), or the like that are configured on the terminal. Further, the computer-readable storage medium may alternatively include both of the internal storage unit of the terminal and the external storage device. The computer-readable storage medium is configured to store the computer program and other programs and data that are required by the terminal. The computer-readable storage medium may be configured to temporarily store data that has been output or is to be output.

An embodiment of this application further provides a computer program product including instructions. When the instructions are run on a computer, the computer is enabled to perform the communication method in any embodiment of this application.

Figure 15:
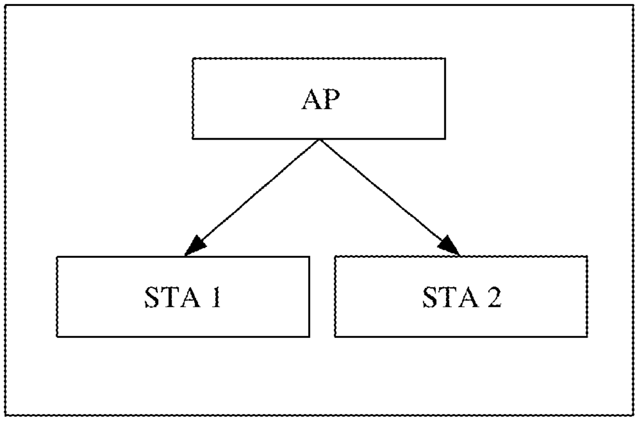
FIG. 15 is a schematic diagram of a communication system according to an embodiment of this application.

FIG. 15 is a structural diagram of a communication system according to an embodiment of this application. As shown in FIG. 15, the communication system may include a STA 1, a STA 2, and an AP.

For specific execution actions of the STA 1 and/or the STA 2, refer to related actions of the STA in the method shown in FIG. 4. For specific execution actions of the AP, refer to related actions of the AP in the method shown in FIG. 4. Details are not described again.

It should be further understood that “first”, “second”, “third”, “fourth”, and various numbers in this specification are merely used for differentiation for ease of description, and are not intended to limit the scope of this application.

It should be understood that the term “and/or” in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication method, wherein the method comprises:

generating a physical layer protocol data unit (PPDU), wherein the PPDU has a plurality of discrete resource units (RUs) in a plurality of sub-channels of a first channel arranged in sub-channel combinations, wherein at least one of the sub-channels in the sub-channel combinations is punctured, at least a first sub-channel combination having one punctured sub-channel and at least a second sub-channel combination having no punctured sub-channels, the plurality of discrete resource units include a plurality of discontinuous discrete resource units in an unpunctured sub-channel in the first sub-channel combination in the first channel by performing single sub-channel RU spreading (SS-RU) on the unpunctured channel, and the plurality of discrete resource units include discrete resource units in a plurality of unpunctured sub-channels in the second sub-channel combination in the first channel; and sending the PPDU.

2. The method according to claim 1, wherein the generating the PPDU having the plurality of discrete resource units includes generating the PPDU having the plurality of discrete resource units including:

in response to the first sub-channel combination having one punctured sub-channel, and the second sub-channel combination having no punctured sub-channel, the plurality of discrete resource units include a first discrete resource unit and a second discrete resource unit.

3. The method according to claim 1, wherein the generating the PPDU having the plurality of discrete resource units includes:

the first channel includes the first sub-channel combination and the second sub-channel combination; and in response to the first sub-channel combination and the second sub-channel combination each having one punctured sub-channel.

4. The method according to claim 1, wherein the generating the PPDU having the plurality of discrete resource units includes:

the first channel includes the first sub-channel combination, and the first sub-channel combination includes all sub-channels in the first channel; and in response to the first sub-channel combination having at least one punctured sub-channel, the plurality of discrete resource units include a first discrete resource unit and a second discrete resource unit.

5. The method according to claim 1, wherein the generating the PPDU having the plurality of discrete resource units includes:

obtaining the first channel by dividing a frequency domain resource, a bandwidth of the frequency domain resource is greater than a first preset bandwidth, a bandwidth of the first channel is a second preset bandwidth, and the frequency domain resource is a pre-configured resource for transmitting data.

6. The method according to claim 1, wherein the generating the PPDU having the plurality of discrete resource units includes:

providing a pilot subcarrier to a discrete resource unit, and the pilot subcarrier is for transmitting a pilot signal.

7. The method according to claim 1, wherein the generating the PPDU having the plurality of discrete resource units includes:

carrying resource scheduling information in the PPDU, and the resource scheduling information is carried in a preamble field of the PPDU.

8. The method according to claim 1, wherein the method further comprises:

receiving a trigger frame from a receive end when the discrete resource unit is for transmitting uplink data, wherein the trigger frame carries resource scheduling information.

9. The method according to claim 8, wherein the receiving the trigger frame from the receive end in response to the discrete resource unit being for transmitting uplink data, wherein the trigger frame carries the resource scheduling information to indicate the plurality of discrete resource units.

10. A communication method, wherein the method comprises:

receiving a physical layer protocol data unit (PPDU), wherein the PPDU has a plurality of discrete resource units (RUs) in a plurality of sub-channels of a first channel arranged in sub-channel combinations, wherein at least one of the sub-channels in the sub-channel combinations is punctured, at least a first sub-channel combination having one punctured sub-channel and at least a second sub-channel combination having no punctured sub-channels, wherein a first discrete RU in an unpunctured sub-channel in the first sub-channel combination is obtained by performing single sub-channel RU spreading on the unpunctured channel and a second discrete resource unit in the second sub-channel combination is obtained by performing multiple sub-channels resource unit spreading, the plurality of discrete resource units include a plurality of discontinuous discrete resource units in the unpunctured sub-channel in the first sub-channel combination in the first channel, and the plurality of discrete resource units include discrete resource units in a plurality of unpunctured sub-channels in the second sub-channel combination in the first channel; and performing data processing on the PPDU, to determine a resource unit allocation status.

11. The method according to claim 10, wherein the receiving the PPDU includes receiving the PPDU including:

in response to the first sub-channel combination having one punctured sub-channel, and the second sub-channel combination having no punctured sub-channel, the plurality of discrete resource units include the first discrete resource unit and the second discrete resource unit.

12. The method according to claim 10, wherein the receiving the PPDU includes receiving the PPDU including:

the first channel having the first sub-channel combination and the second sub-channel combination; and in response to the first sub-channel combination and the second sub-channel combination each having one punctured sub-channel.

13. The method according to claim 10, wherein the receiving the PPDU includes receiving the PPDU including:

the first channel having the first sub-channel combination, and the first sub-channel combination includes all sub-channels in the first channel; and in response to the first sub-channel combination having at least one punctured sub-channel, the plurality of discrete resource units include the first discrete resource unit and the second discrete resource unit.

14. The method according to claim 10, wherein the receiving the PPDU includes receiving the PPDU including:

obtaining the first channel by dividing a frequency domain resource, a bandwidth of the frequency domain resource is greater than a first preset bandwidth, a bandwidth of the first channel is a second preset bandwidth, and the frequency domain resource is a pre-configured resource for transmitting data.

15. The method according to claim 10, wherein the receiving the PPDU includes receiving the PPDU including providing a pilot subcarrier to a discrete resource unit, and the pilot subcarrier is for transmitting a pilot signal.

16. The method according to claim 10, wherein the receiving the PPDU includes receiving the PPDU including:

carrying resource scheduling information in the PPDU, and the resource scheduling information is carried in a preamble field of the PPDU.

17. The method according to claim 16, wherein the receiving the PPDU including the PDDU carrying:

the resource scheduling information to indicate the plurality of discrete resource units.

18. The method according to claim 10, wherein the method further comprises:

sending a trigger frame to a transmit end in response to the discrete resource unit being for transmitting uplink data, wherein the trigger frame carries resource scheduling information.

19. A communication apparatus, comprising:

a communication interface;

a memory storing computer-readable instructions; and a processor connected to the memory, wherein the processor is configured to execute the computer-readable instructions to perform operations to:

generate a physical layer protocol data unit (PPDU), wherein the PPDU has a plurality of discrete resource units (RUs) in a plurality of sub-channels of a first channel arranged in sub-channel combinations, wherein at least one of the sub-channels in the sub-channel combinations is punctured, at least a first sub-channel combination having one punctured sub-channel and at least a second sub-channel combination has no punctured sub-channels, the plurality of discrete resource units includes a plurality of discontinuous discrete resource units, the plurality of discreate resource units include a plurality of discrete resource units in an unpunctured sub-channel in the first sub-channel combination in the first channel by performing single sub-channel RU spreading (SS-RU) on the unpunctured channel, and the plurality of discrete resource units include discrete resource units in a plurality of unpunctured sub-channels in the second sub-channel combination in the first channel; and send, via the communication interface, the PPDU.

20. A communication apparatus, comprising:

a communication interface;

a memory storing computer-readable instructions; and a processor connected to the memory, wherein the processor is configured to execute the computer-readable instructions to perform operations to:

receive, via the communication interface, a physical layer protocol data unit (PPDU), wherein the PPDU has a plurality of discrete resource units (RUs) in a plurality of sub-channels of a first channel arranged in sub-channel combinations, wherein at least one of the sub-channels in the sub-channel combinations is punctured, at least a first sub-channel combination having one punctured sub-channel and at least a second sub-channel combination has no punctured sub-channels, wherein a first discrete RU in an unpunctured sub-channel in the first sub-channel combination is obtained by performing single sub-channel RU spreading on the unpunctured channel and a second discrete RU in the second sub-channel combination is obtained by performing multiple sub-channels resource unit spreading, the plurality of discrete resource units include a plurality of discontinuous discrete resource units in the unpunctured sub-channel in the first sub-channel combination in the first channel, and the plurality of discrete resource units include discrete resource units in a plurality of unpunctured sub-channels in the second sub-channel combination in the first channel; and perform data processing on the PPDU, to determine a resource unit allocation status.

* * * * *